United States Patent
Addepalli et al.

(10) Patent No.: US 8,903,593 B1
(45) Date of Patent: Dec. 2, 2014

(54) SYSTEM AND METHOD FOR ANALYZING VEHICULAR BEHAVIOR IN A NETWORK ENVIRONMENT

(75) Inventors: Sateesh K. Addepalli, San Jose, CA (US); Lillian Lei Dai, Rockville, MD (US); Ashok K. Moghe, Pleasanton, CA (US); Flavio Bonomi, Palo Alto, CA (US); Rodolfo A. Milito, Los Gatos, CA (US); Vina Ermagan, San Jose, CA (US); Fabio R. Maino, Palo Alto, CA (US); Pere Monclus, San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 13/117,860

(22) Filed: May 27, 2011

Related U.S. Application Data

(60) Provisional application No. 61/433,138, filed on Jan. 14, 2011.

(51) Int. Cl.
| | | |
|---|---|---|
| *G01M 17/00* | (2006.01) | |
| *G06F 7/00* | (2006.01) | |
| *G06F 11/30* | (2006.01) | |
| *G06F 19/00* | (2011.01) | |
| *G07C 5/00* | (2006.01) | |

(52) U.S. Cl.
USPC ............ 701/29.1; 701/29.9; 701/33; 701/34; 701/35; 701/36

(58) Field of Classification Search
CPC ............ B60R 21/013; B60R 21/0132; B60R 21/0134
USPC ............ 701/1, 29, 30, 33, 35, 36, 29.1, 29.3, 701/114, 115
See application file for complete search history.

(56) References Cited

U.S. PATENT DOCUMENTS

| | | |
|---|---|---|
| 5,428,666 A | 6/1995 | Fyfe et al. |
| 5,604,787 A | 2/1997 | Kotzin et al. |

(Continued)

FOREIGN PATENT DOCUMENTS

| | | |
|---|---|---|
| DE | 10146664 A1 | 2/2003 |
| EP | 1337119 A | 8/2003 |

(Continued)

OTHER PUBLICATIONS

Wahab, Driving Profile Modeling and Recognition Based on Soft Computing Approach, 2009.*

(Continued)

*Primary Examiner* — Jason Holloway
*Assistant Examiner* — Rachid Bendidi
(74) *Attorney, Agent, or Firm* — Patent Capital Group

(57) ABSTRACT

A method in one example embodiment includes receiving a set of data in real time from a plurality of machine devices associated with at least one vehicle, providing a set of reference data corresponding to a machine device of the plurality of machine devices, comparing the set of data with the set of reference data, and detecting a deviation within the set of data from the set of reference data. The method further includes initiating an operation associated with the deviation. The set of reference data could be a trend of previous data received from the machine device or a common trend based on a previous set of data of the machine device. More specific embodiments include receiving a plurality of data containing the set of data from the plurality of machine devices and identifying a state of the machine device using the set of data.

22 Claims, 12 Drawing Sheets

(56) References Cited

U.S. PATENT DOCUMENTS

| | | | |
|---|---|---|---|
| 5,737,215 A * | 4/1998 | Schricker et al. | ............... 700/29 |
| 5,763,862 A | 6/1998 | Jachimowicz et al. | |
| 5,933,773 A | 8/1999 | Barvesten | |
| 5,987,325 A | 11/1999 | Tayloe | |
| 6,002,929 A | 12/1999 | Bishop et al. | |
| 6,078,652 A | 6/2000 | Barak | |
| 6,169,387 B1 | 1/2001 | Kaib | |
| 6,175,789 B1 | 1/2001 | Beckert et al. | |
| 6,285,869 B1 | 9/2001 | Shannon et al. | |
| 6,320,351 B1 | 11/2001 | Ng et al. | |
| 6,427,072 B1 | 7/2002 | Reichelt | |
| 6,427,073 B1 | 7/2002 | Kortesalmi et al. | |
| 6,484,082 B1 | 11/2002 | Millsap et al. | |
| 6,490,679 B1 | 12/2002 | Tumblin et al. | |
| 6,516,357 B1 | 2/2003 | Hamann et al. | |
| 6,526,272 B1 | 2/2003 | Bansal et al. | |
| 6,574,734 B1 | 6/2003 | Colson et al. | |
| 6,587,127 B1 | 7/2003 | Leeke et al. | |
| 6,604,140 B1 | 8/2003 | Beck et al. | |
| 6,643,504 B1 | 11/2003 | Chow et al. | |
| 6,668,179 B2 | 12/2003 | Jiang | |
| 6,714,799 B1 | 3/2004 | Park et al. | |
| 6,721,580 B1 | 4/2004 | Moon | |
| 6,735,506 B2 * | 5/2004 | Breed et al. | ............... 701/36 |
| 6,757,262 B1 | 6/2004 | Weisshaar et al. | |
| 6,823,244 B2 * | 11/2004 | Breed | ............... 701/29.7 |
| 6,868,282 B2 | 3/2005 | Carlsson | |
| 6,914,517 B2 | 7/2005 | Kinsella | |
| 6,925,425 B2 * | 8/2005 | Remboski et al. | ............... 702/188 |
| 6,928,299 B1 | 8/2005 | Rinne et al. | |
| 6,934,391 B1 | 8/2005 | Linkola et al. | |
| 6,957,199 B1 | 10/2005 | Fisher | |
| 6,980,830 B2 | 12/2005 | Ahonen | |
| 7,039,221 B1 | 5/2006 | Tumey et al. | |
| 7,050,897 B2 * | 5/2006 | Breed et al. | ............... 701/46 |
| 7,064,711 B2 | 6/2006 | Strickland et al. | |
| 7,069,144 B2 | 6/2006 | Yoshihara et al. | |
| 7,082,359 B2 * | 7/2006 | Breed | ............... 701/36 |
| 7,096,316 B1 | 8/2006 | Karr et al. | |
| 7,171,460 B2 | 1/2007 | Kalavade et al. | |
| 7,178,724 B2 | 2/2007 | Tamagno et al. | |
| 7,185,161 B2 | 2/2007 | Kang | |
| 7,218,930 B2 | 5/2007 | Ko et al. | |
| 7,222,783 B2 | 5/2007 | Merrien | |
| 7,259,469 B2 | 8/2007 | Brummett et al. | |
| 7,363,056 B2 | 4/2008 | Faisy | |
| 7,389,178 B2 * | 6/2008 | Raz et al. | ............... 701/29.1 |
| 7,558,110 B2 | 7/2009 | Mizushima et al. | |
| 7,564,842 B2 | 7/2009 | Callaway et al. | |
| 7,593,605 B2 | 9/2009 | King et al. | |
| 7,603,107 B2 | 10/2009 | Ratert et al. | |
| 7,606,643 B2 | 10/2009 | Hunt et al. | |
| 7,630,802 B2 * | 12/2009 | Breed | ............... 701/31.6 |
| 7,631,033 B2 | 12/2009 | Zehler | |
| 7,636,626 B2 * | 12/2009 | Oesterling et al. | ............... 701/34.4 |
| 7,689,231 B2 | 3/2010 | Mardiks et al. | |
| 7,689,251 B2 | 3/2010 | Bae | |
| 7,729,725 B2 | 6/2010 | Stenmark | |
| 7,738,891 B2 | 6/2010 | Tenhunen et al. | |
| 7,755,472 B2 | 7/2010 | Grossman | |
| 7,778,227 B2 | 8/2010 | Gibbs | |
| 7,787,602 B2 | 8/2010 | Pearson et al. | |
| 7,791,310 B2 | 9/2010 | Luz et al. | |
| 7,792,618 B2 | 9/2010 | Quigley et al. | |
| 7,808,375 B2 | 10/2010 | Bertness et al. | |
| 7,844,817 B2 | 11/2010 | Mueller et al. | |
| 7,849,020 B2 | 12/2010 | Johnson | |
| 7,904,569 B1 * | 3/2011 | Gelvin et al. | ............... 709/229 |
| 7,917,251 B2 | 3/2011 | Kressner et al. | |
| 7,957,729 B2 | 6/2011 | Roter et al. | |
| 7,957,744 B2 | 6/2011 | Oesterling et al. | |
| 8,054,038 B2 | 11/2011 | Kelty et al. | |
| 8,061,140 B2 | 11/2011 | Harmon | |
| 8,063,797 B1 | 11/2011 | Sonnabend et al. | |
| 8,081,643 B2 | 12/2011 | Sonoda et al. | |
| 8,086,395 B2 | 12/2011 | Mino | |
| 8,095,184 B2 | 1/2012 | Hiltunen et al. | |
| 8,100,206 B2 | 1/2012 | Kressner et al. | |
| 8,131,317 B2 | 3/2012 | Lee | |
| 8,135,443 B2 | 3/2012 | Aleksic et al. | |
| 8,140,064 B2 | 3/2012 | Mardiks | |
| 8,143,741 B2 | 3/2012 | Funakoshi et al. | |
| 8,144,596 B2 | 3/2012 | Veillette | |
| 8,180,400 B2 | 5/2012 | Shin et al. | |
| 8,195,233 B2 | 6/2012 | Morikuni et al. | |
| 8,195,235 B2 | 6/2012 | Montes | |
| 8,207,642 B2 | 6/2012 | Lafontaine et al. | |
| 8,233,389 B2 | 7/2012 | Yim et al. | |
| 8,244,468 B2 | 8/2012 | Scalisi et al. | |
| 8,249,087 B2 | 8/2012 | Takada et al. | |
| 8,294,420 B2 | 10/2012 | Kocher | |
| 8,296,373 B2 | 10/2012 | Bosworth et al. | |
| 8,335,493 B2 | 12/2012 | Angelhag | |
| 8,364,959 B2 | 1/2013 | Bhanoo et al. | |
| 8,378,623 B2 | 2/2013 | Kusch et al. | |
| 2002/0006139 A1 | 1/2002 | Kikkawa et al. | |
| 2002/0072388 A1 | 6/2002 | Korneluk et al. | |
| 2002/0097855 A1 | 7/2002 | Neudeck et al. | |
| 2002/0103964 A1 | 8/2002 | Igari | |
| 2002/0165008 A1 | 11/2002 | Sashihara et al. | |
| 2002/0174360 A1 | 11/2002 | Ikeda | |
| 2002/0198632 A1 * | 12/2002 | Breed et al. | ............... 701/1 |
| 2003/0005435 A1 | 1/2003 | Nelger et al. | |
| 2003/0009271 A1 | 1/2003 | Akiyama | |
| 2003/0028763 A1 | 2/2003 | Malinen et al. | |
| 2003/0046228 A1 | 3/2003 | Berney | |
| 2003/0051041 A1 | 3/2003 | Kalavade et al. | |
| 2003/0083968 A1 | 5/2003 | Marsh et al. | |
| 2003/0152038 A1 | 8/2003 | Oshima et al. | |
| 2003/0191939 A1 | 10/2003 | Tsai et al. | |
| 2004/0008677 A1 | 1/2004 | Cen | |
| 2004/0022216 A1 | 2/2004 | Shi | |
| 2004/0023689 A1 | 2/2004 | Ahonen | |
| 2004/0024670 A1 | 2/2004 | Valenzuela et al. | |
| 2004/0042604 A1 | 3/2004 | Hiltunen et al. | |
| 2004/0073339 A1 * | 4/2004 | Ruoppolo | ............... 701/1 |
| 2004/0083043 A1 | 4/2004 | Akiyama et al. | |
| 2004/0087305 A1 | 5/2004 | Jiang et al. | |
| 2004/0137890 A1 | 7/2004 | Kalke | |
| 2004/0143386 A1 | 7/2004 | Yoshihara et al. | |
| 2004/0162653 A1 | 8/2004 | Ban et al. | |
| 2004/0165656 A1 | 8/2004 | Shiue et al. | |
| 2004/0171386 A1 | 9/2004 | Mitjana | |
| 2004/0204087 A1 | 10/2004 | Carlsson | |
| 2004/0229601 A1 | 11/2004 | Zabawskyj et al. | |
| 2004/0230345 A1 * | 11/2004 | Tzamaloukas | ............... 701/1 |
| 2004/0249915 A1 | 12/2004 | Russell | |
| 2004/0256451 A1 | 12/2004 | Goman et al. | |
| 2005/0009563 A1 | 1/2005 | Stenmark | |
| 2005/0018883 A1 | 1/2005 | Scott | |
| 2005/0020250 A1 | 1/2005 | Chaddha et al. | |
| 2005/0039027 A1 | 2/2005 | Shapiro | |
| 2005/0065678 A1 * | 3/2005 | Smith et al. | ............... 701/29 |
| 2005/0075137 A1 | 4/2005 | Reemtsma | |
| 2005/0101323 A1 | 5/2005 | De Beer | |
| 2005/0124288 A1 | 6/2005 | Karmi et al. | |
| 2005/0162687 A1 | 7/2005 | Lee | |
| 2005/0239504 A1 | 10/2005 | Ishi et al. | |
| 2005/0266883 A1 | 12/2005 | Chatrath | |
| 2005/0271037 A1 | 12/2005 | Habaguchi et al. | |
| 2005/0282554 A1 | 12/2005 | Shyy et al. | |
| 2006/0020783 A1 | 1/2006 | Fisher | |
| 2006/0031590 A1 | 2/2006 | Monette et al. | |
| 2006/0059340 A1 | 3/2006 | Eldenmalm et al. | |
| 2006/0068786 A1 | 3/2006 | Florence | |
| 2006/0075242 A1 | 4/2006 | Aissi et al. | |
| 2006/0076420 A1 | 4/2006 | Prevost et al. | |
| 2006/0079237 A1 | 4/2006 | Liu et al. | |
| 2006/0079254 A1 | 4/2006 | Hogan | |
| 2006/0089157 A1 | 4/2006 | Casey | |
| 2006/0129848 A1 | 6/2006 | Paksoy et al. | |
| 2006/0160532 A1 | 7/2006 | Buckley et al. | |
| 2006/0172772 A1 | 8/2006 | Bjorkner | |
| 2006/0181521 A1 | 8/2006 | Perreault et al. | |

(56) References Cited

U.S. PATENT DOCUMENTS

| | | |
|---|---|---|
| 2006/0183500 A1 | 8/2006 | Choi |
| 2006/0218337 A1 | 9/2006 | Hashimoto |
| 2006/0224887 A1 | 10/2006 | Vesikivi et al. |
| 2006/0234693 A1 | 10/2006 | Isidore et al. |
| 2006/0277589 A1 | 12/2006 | Margis et al. |
| 2006/0282554 A1 | 12/2006 | Jiang et al. |
| 2006/0285538 A1 | 12/2006 | Oommen |
| 2006/0291455 A1 | 12/2006 | Katz et al. |
| 2007/0004457 A1 | 1/2007 | Han |
| 2007/0005202 A1* | 1/2007 | Breed ............................. 701/29 |
| 2007/0021847 A1 | 1/2007 | Hyodo et al. |
| 2007/0027583 A1* | 2/2007 | Tamir et al. ........................ 701/1 |
| 2007/0060200 A1 | 3/2007 | Boris et al. |
| 2007/0067085 A1 | 3/2007 | Lu et al. |
| 2007/0077966 A1 | 4/2007 | Huang |
| 2007/0094337 A1 | 4/2007 | Klassen et al. |
| 2007/0105531 A1 | 5/2007 | Schroeder, Jr. |
| 2007/0124490 A1 | 5/2007 | Kalavade et al. |
| 2007/0129072 A1 | 6/2007 | Yamato et al. |
| 2007/0130156 A1 | 6/2007 | Tenhunen et al. |
| 2007/0139216 A1* | 6/2007 | Breed ...................... 340/825.72 |
| 2007/0149170 A1 | 6/2007 | Bloebaum et al. |
| 2007/0167161 A1 | 7/2007 | Cheng et al. |
| 2007/0177562 A1 | 8/2007 | Castrogiovanni et al. |
| 2007/0198144 A1 | 8/2007 | Norris et al. |
| 2007/0202895 A1 | 8/2007 | Benco et al. |
| 2007/0218947 A1 | 9/2007 | Buckley |
| 2007/0223031 A1 | 9/2007 | Kitada et al. |
| 2007/0225873 A1 | 9/2007 | Toya et al. |
| 2007/0238449 A1 | 10/2007 | Park et al. |
| 2007/0254713 A1 | 11/2007 | Lagnado et al. |
| 2007/0255797 A1 | 11/2007 | Dunn et al. |
| 2007/0265735 A1 | 11/2007 | Chigusa |
| 2007/0266428 A1 | 11/2007 | Downes et al. |
| 2007/0271014 A1* | 11/2007 | Breed ............................. 701/29 |
| 2007/0273492 A1 | 11/2007 | Hara et al. |
| 2008/0020755 A1 | 1/2008 | Liu et al. |
| 2008/0020773 A1 | 1/2008 | Black et al. |
| 2008/0027606 A1* | 1/2008 | Helm ............................. 701/33 |
| 2008/0028230 A1 | 1/2008 | Shatford |
| 2008/0040005 A1* | 2/2008 | Breed ............................. 701/48 |
| 2008/0051062 A1 | 2/2008 | Lee |
| 2008/0072299 A1 | 3/2008 | Reiher |
| 2008/0087720 A1 | 4/2008 | Levitov |
| 2008/0120504 A1 | 5/2008 | Kirkup et al. |
| 2008/0147265 A1* | 6/2008 | Breed ............................. 701/30 |
| 2008/0147271 A1* | 6/2008 | Breed ............................. 701/36 |
| 2008/0169350 A1 | 7/2008 | Audebert et al. |
| 2008/0205416 A1 | 8/2008 | DeChiara |
| 2008/0209545 A1 | 8/2008 | Asano |
| 2008/0220743 A1 | 9/2008 | Mora et al. |
| 2008/0226074 A1 | 9/2008 | Sammour et al. |
| 2008/0227604 A1* | 9/2008 | Daniel ............................. 482/74 |
| 2008/0254766 A1 | 10/2008 | Craven |
| 2008/0261561 A1 | 10/2008 | Gehrmann |
| 2008/0265024 A1 | 10/2008 | Tracy et al. |
| 2008/0284575 A1* | 11/2008 | Breed ............................. 340/438 |
| 2008/0289018 A1 | 11/2008 | Kawaguchi |
| 2008/0290161 A1 | 11/2008 | Blake |
| 2008/0311912 A1 | 12/2008 | Balasubramanian et al. |
| 2009/0003283 A1 | 1/2009 | Meylan |
| 2009/0007250 A1 | 1/2009 | Pouzin et al. |
| 2009/0019528 A1 | 1/2009 | Wei et al. |
| 2009/0037207 A1 | 2/2009 | Farah |
| 2009/0043441 A1* | 2/2009 | Breed ............................. 701/29 |
| 2009/0061839 A1 | 3/2009 | Zimmerman et al. |
| 2009/0077643 A1 | 3/2009 | Schmidt et al. |
| 2009/0138136 A1 | 5/2009 | Natsume |
| 2009/0163175 A1 | 6/2009 | Shi et al. |
| 2009/0215449 A1 | 8/2009 | Avner |
| 2009/0225736 A1 | 9/2009 | Patarkazishvili |
| 2009/0227230 A1 | 9/2009 | Camilleri et al. |
| 2009/0312850 A1 | 12/2009 | Higuchi et al. |
| 2010/0005313 A1 | 1/2010 | Dai |
| 2010/0037057 A1 | 2/2010 | Shim et al. |
| 2010/0085868 A1 | 4/2010 | Guo et al. |
| 2010/0088401 A1 | 4/2010 | DeGraeve et al. |
| 2010/0112997 A1 | 5/2010 | Roundtree |
| 2010/0167724 A1 | 7/2010 | Haran et al. |
| 2010/0183016 A1 | 7/2010 | Bonk et al. |
| 2010/0202346 A1 | 8/2010 | Sitzes et al. |
| 2010/0215043 A1 | 8/2010 | Hisada |
| 2010/0226291 A1 | 9/2010 | Gorbachov |
| 2010/0232404 A1 | 9/2010 | Chen et al. |
| 2010/0234009 A1 | 9/2010 | Antani et al. |
| 2010/0248690 A1 | 9/2010 | Biggs et al. |
| 2010/0279653 A1 | 11/2010 | Poltorak |
| 2010/0280956 A1 | 11/2010 | Chutorash et al. |
| 2010/0291924 A1 | 11/2010 | Antrim et al. |
| 2010/0294750 A1 | 11/2010 | Hogenmueller et al. |
| 2010/0311391 A1 | 12/2010 | Siu et al. |
| 2010/0311404 A1 | 12/2010 | Shi et al. |
| 2010/0311418 A1 | 12/2010 | Shi et al. |
| 2010/0311444 A1 | 12/2010 | Shi et al. |
| 2011/0034201 A1 | 2/2011 | Hamada et al. |
| 2011/0055292 A1 | 3/2011 | Madau et al. |
| 2011/0059738 A1 | 3/2011 | Waller |
| 2011/0071718 A1 | 3/2011 | Norris et al. |
| 2011/0106375 A1* | 5/2011 | Gurusamy Sundaram ..... 701/33 |
| 2011/0149982 A1 | 6/2011 | Hwang et al. |
| 2012/0004933 A1* | 1/2012 | Foladare et al. .................. 705/4 |
| 2012/0089299 A1* | 4/2012 | Breed ............................. 701/36 |
| 2012/0109418 A1* | 5/2012 | Lorber ............................. 701/1 |
| 2012/0109446 A1 | 5/2012 | Yousefi et al. |
| 2012/0182935 A1 | 7/2012 | Addepalli et al. |
| 2013/0018575 A1 | 1/2013 | Birken et al. |
| 2013/0159466 A1 | 6/2013 | Mao |

FOREIGN PATENT DOCUMENTS

| | | |
|---|---|---|
| EP | 1696357 | 8/2006 |
| EP | 1727383 | 11/2006 |
| EP | 1737160 | 12/2006 |
| EP | 1758335 | 2/2007 |
| GB | 2294787 | 5/1996 |
| GB | 2313257 A | 11/1997 |
| GB | 2386803 A | 9/2003 |
| GB | 2406925 | 10/2003 |
| GB | 2406925 | 4/2005 |
| JP | 2000194660 | 7/2000 |
| WO | WO 92/19078 | 10/1992 |
| WO | WO 99/24938 | 5/1999 |
| WO | WO 99/27730 | 6/1999 |
| WO | WO 99/46682 | 9/1999 |
| WO | WO 00/79368 | 12/2000 |
| WO | WO 0111577 | 2/2001 |
| WO | WO 02/067563 | 8/2002 |
| WO | WO 02/089449 | 11/2002 |
| WO | WO 03/007639 | 1/2003 |
| WO | WO 2004/021296 | 3/2004 |
| WO | WO 2005/029890 | 3/2005 |
| WO | WO 2006/094564 | 9/2006 |
| WO | WO 2007/143342 | 12/2007 |
| WO | WO 2008/040964 | 4/2008 |
| WO | WO 2009/082759 | 7/2009 |

OTHER PUBLICATIONS

U.S. Appl. No. 13/014,605, entitled "System and Method for Enabling Secure Transactions Using Flexible Identity Management in a Vehicular Environment," filed Jan. 26, 2011, Inventors: Sateesh K. Addepalli et al.
U.S. Patent Application Serial No. 13/071,367,605, entitled "System and Method for Wireless Interface Selection and for Communication and Access Control of Subsystems, Devices, and Data in a Vehicular Environment," filed Mar. 24, 2011, Inventors: Sateesh K. Addepalli et al.
U.S. Appl. No. 13/083,305, entitled "System and Method for Applications Management in a Networked Vehicular Environment," filed Apr. 8, 2011, Inventors: Sateesh K. Addepalli et al.
U.S. Appl. No. 13/087,884, entitled "System and Method for Discovery, Trusted Execution, and Admission Control in a Vehicular

(56) References Cited

OTHER PUBLICATIONS

Environment," filed Apr. 15, 2011, Inventors: Sateesh K. Addepalli et al.

U.S. Appl. No. 13/087,884, entitled "System and Method for Packet Distribution in a Vehicular Network Environment," filed May 5, 2011, Inventors: Sateesh K. Addepalli et al.

U.S. Appl. No. 13/104,737, entitled "System and Method for Internal Networking, Data Optimization and Dynamic Frequency Selection in a Vehicular Environment," filed May 10, 2011, Inventors: Sateesh K. Addepalli et al.

U.S. Appl. No. 13/108,631, entitled "System and Method for Real-Time Synthesis and Performance Enhancement of Audio/Video Data, and Noise Cancellation and Gesture Based User Interfaces in a Vehicular Environment," filed May 10, 2011, Inventors: Sateesh K. Addepalli et al.

U.S. Appl. No. 13/111,425, entitled "System and Method for Providing Resource Sharing, Synchronizing, Media Coordination, Transcoding, and Traffic Management in a Vehicular Environment," filed May 19, 2011, Inventors: Sateesh K. Addepalli et al.

U.S. Appl. No. 13/114,659, entitled "System and Method for Transport, Network, Translation, and Adaptive Coding in a Vehicular Network Environment," filed May 24, 2011, Inventors: Sateesh K. Addepalli et al.

Autonet Mobile, "Autonet Mobile Features, Technology Specifications," autonetmobile.com, 1 page; [retrieved and printed Apr. 8, 2011] http://www.autonetmobile.com/service/anmdev.html.

Autonet Mobile, "CARFI Features, Technology Specifications," autonetmobile.com, 1 page; [retrieved and printed Apr. 8, 2011] http://autonetmobile.com/service/carfidev.html.

Autonet Mobile, "It's What Your Car has been Waiting for," autonetmobile.com, 2 pages; [retrieved and printed Apr. 8, 2011] http://www.autonetmobile.com/service/.

"Cisco Mobile Network Solutions for Commercial Transit Agencies," Cisco.com, © 2008 Cisco Systems, Inc., 8 pages; http://www.cisco.com/en/US/prod/collateral/routers/ps272/white_paper_c11-4921115.html "Cisco Mobile Network Solutions for Public Safety," Cisco.com, 2008 Cisco Systems, Inc., 7 pages; http://www.cisco.com/en/US/prod/collateral/routers/ps272/prod_white_paper0900aecd806220af.html.

Farinacci, D. et al., "LISP Mobile Node," Network Working Group Internet Draft, Feb. 1, 2010, 22 pages; http://tools.ietf.org/id/draft-meyer-lisp-mn-01.txt.

Ibars, Christian et al., "Wireless Services in the Connected Vehicle Era," IEEE Communications Magazine, Dec. 23, 2010, 13 pages.

Robert Bosch GmbH, *Automotive Electrics Automotive Electronics, Systems and Components, New: Networking Hybrid Drive*, 5$^{th}$ Edition, Nov. 2007, BentleyPublishers.com, 255 pages (two parts submitted: Part 1—121 pages; Part 2—131 pages).

Lillian Lei Dai, "*Proactive Mobile Wireless Networks: an infrastructureless wireless network architecture for delay-sensitive applications,*" Massachusetts Institute of Technology, Jun. 2008 (two parts submitted: Part 1—105 pages; Part 2—97 pages).

Zeldovich, Nickalai et al., "Making Information Flow Explicit in HiStar," OSDI '06: 7$^{th}$ USENIX Symposium on Operating Systems Design and Implementation, Nov. 2006, 16 pages.

Zeldovich, Nickolai et al., "Security Distributed Systems with Information Flow Control," NSDI '08: 5$^{th}$ USENIX Symposium on Networked Systems Design and Implementation, Apr. 2008, 16 pages.

Ibars, Christian et al., "Radio Resource Allocation for a High Capacity Vehicular Access Network," 4th International Symposium on Wireless Vehicular Communications: WIVEC2011, Sep. 5-6, 2011, San Francisco, CA; U.S., 5 pages, http://www.ieeevtc.org/wivec2011/.

U.S. Appl. No. 13/071,367, entitled "System and Method for Wireless Interface Selection and for Communication and Access Control of Subsystems, Devices, and Data in a Vehicular Environment," filed Mar. 24, 2011, Inventors: Sateesh K. Addepalli et al.

U.S. Appl. No. 13/118,220, entitled "System and Method for Routing, Mobility, Application Services, Discovery, and Sensing in a Vehicular Network Environment," filed May 27, 2011, Inventors: Sateesh K. Addepalli et al.

U.S. Appl. No. 13/118,024, entitled "System and Method for Enabling a Vehicular Access Network in a Vehicular Environment," filed May 27, 2011, Inventors: Sateesh K. Addepalli et al.

EPO May 22, 2012 European Search Report and Written Opinion from EP 12150208.2.

U.S. Appl. No. 13/943,114, entitled "System and Method for Enabling a Vehicular Access Network in a Vehicular Environment," filed Jul. 16, 2013, Inventors: Sateesh K. Addepalli et al.

Freeman, Shanna, "How OnStar Works," HowStuffWorks.com, a Discovery Company; [Retrieved and printed Jul. 19, 2013] http://auto.howstuffworks.com/onstar2.htm/printable.

Blazevic, Ljubica, et al., "A Location-Based Routing Method for Mobile Ad Hoc Networks," IEEE Transactions on Mobile Computing, vol. 4, No. 2, Mar./Apr. 2005; 14 pages.

EPO Jan. 21, 2013 EPO Response to Communication regarding Written Opinion from EP 12150208.2.

PCT Apr. 22, 2009 International Search Report for PCT/US08/88320; 3 pages.

PCT Jun. 29, 2010 International Preliminary Report on Patentability and Written Opinion of the International Searching Authority for PCT/US08/88320; 10 pages.

"TCG Mobile Trusted Module Specification." Trusted Computing Group, Specification version 1.0, Revision 6, Jun. 2008, 105 pages; http://www.trustedcomputinggroup.org/files/resource_files/87852F33-1D09-3519-AD0C0F141CC6B10D/Revision_6-tcg-mobile-trusted-module-1_0.pdf.

Alves, T., et al., "TrustZone: Integrated Hardware and Software Security," Information Quarterly, vol. 3, No. 4, 2004, pp. 18-24; http://www.iqmagazineonline.com/magazine/pdf/v_3_4_pdf/Pg18_24_custZone_Secur.pdf.

Arsenault, A., et al., "Securely Available Credentials—Requirements," IETF, Network Working Group, RFC 3157, Baltimore Technologies, Aug. 2001, 20 pages.

Bickhart, Ryan W., et al., "Transparent TCP-to-SCTP Translation Shim Layer," EuroBSDCon 2007, Copenhagen, Denmark; 14 pages.

Bilstrup, "A Survey Regarding Wireless Communication Standards Intended for a High-Speed Vehicle Environment," Technical Report IDE0712, Feb. 2007, 51 pages.

Boman, K., Niemi, V., et al. "UMTS Security," Electronics and Communication Engineerying Journal, Oct. 2002, 14 pages; http://www.it.iitb.ac.in/~kavita/GSM_Security_Papers/New%20papers/umts_security.pdf.

Dierks, T., et al., "The Transport Layer Security (TLS) Protocol," (Version 1.1), Network Working Group, RFC 4346, Apr. 2006, 87 pages; http://www.rfc-editor.org/rfc/pdfrfc/rfc4346.txt.pdf.

Harkins, D., et al., "The Internet Key Exchange (IKE)," Network Working Group, RFC 2409, Nov. 1998, 41 pages; http://www.rfc-editor.org/rfc/pdfrfc/rfc2409.txt.pdf.

Hsu, WAVE/DSRC Development and Standardization, Industrial Technology Research Institute, 2010, 84 pages.

Kent, S., et al., "Security Architecture for the Internet Protocol," Network Working Group, RFC 2401, Nov. 1998, 66 pages; http://www.rfc-editor.org/rfc/pdfrfc/rfc2401.txt.pdf.

Scarfone, Karen et al., "Guide to Instrusion Detection and Prevention Systems (IDPS)," NIST (National Institute of Standards and Technology), Special Publication 800-94, Feb. 2007, 127 pages http://csrc.ncsl.nist.gov/publications/nistpubs/800-94/SP800-94.pdf.

Shevade, Updendra et al., "Enabling High-Bandwidth Vehicular Content Distribution," ACM CoNEXT 2010, Philadelphia, PA, Nov. 2010, 12 pages http://www.cs.utexas.edu/~lili/papers/pub/conext10.pdf.

Weigle, Standards: WAVE/DSCRC/802.11p, Old Dominion University, 2008, 19 pages.

EPO Jul. 1, 2013 EPO Communication regarding EP 12150208.2; 5 pages.

U.S. Appl. No. 14/243,304, entitled "System and Method for Real-Time Synthesis and Performance Enhancement of Audio/Video

(56) References Cited

OTHER PUBLICATIONS

Data, and Noise Cancellation and Gesture Based User Interfaces in a Vehicular Environment," filed Apr. 2, 2014, Inventors: Sateesh K. Addepalli et al.

U.S. Appl. No. 14/242,122, entitled "System and Method for Internal Networking, Data Optimization and Dynamic Frequency Selection in a Vehicular Environment," filed Apr. 1, 2014, Inventors: Sateesh K. Addepalli et al.

* cited by examiner

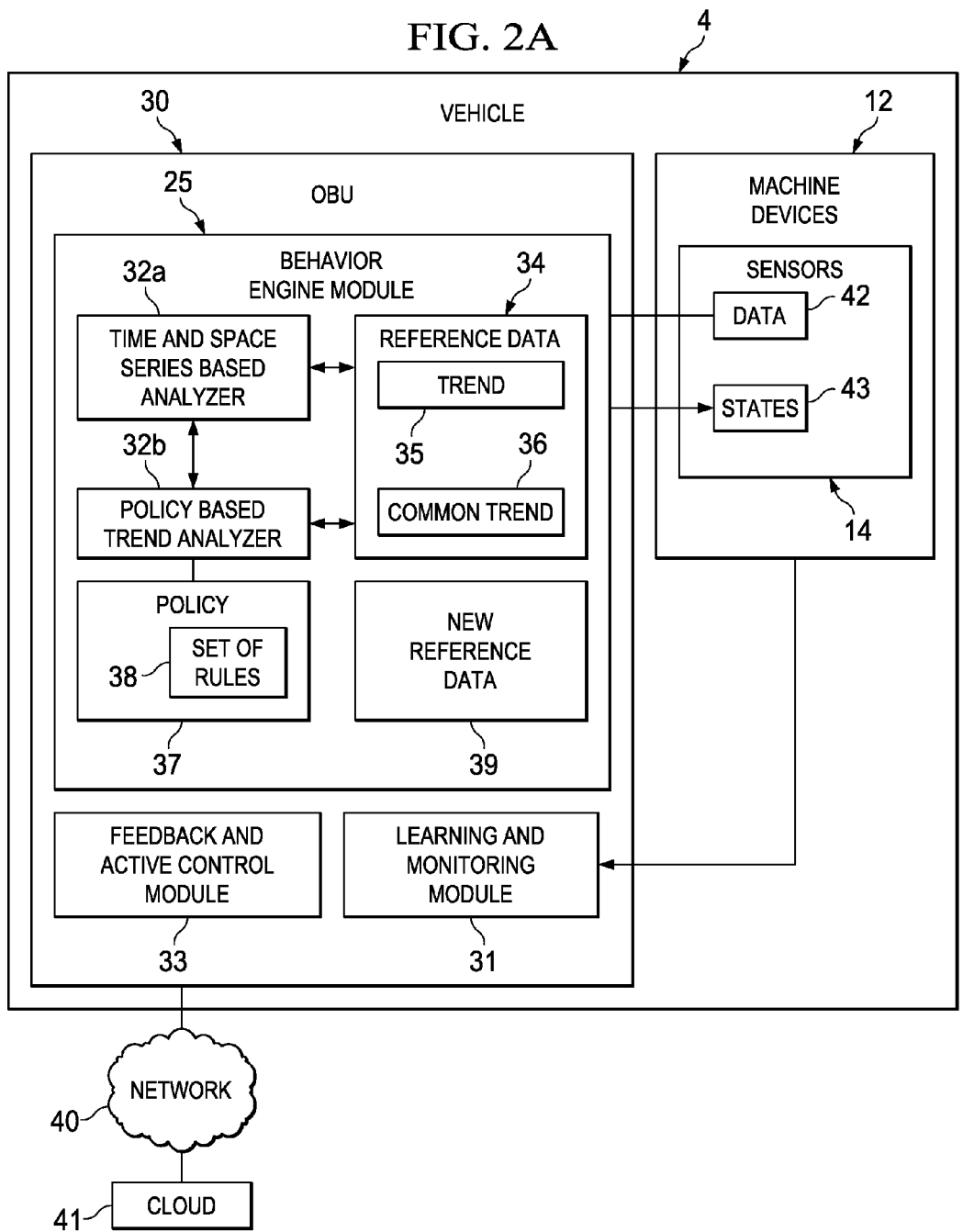

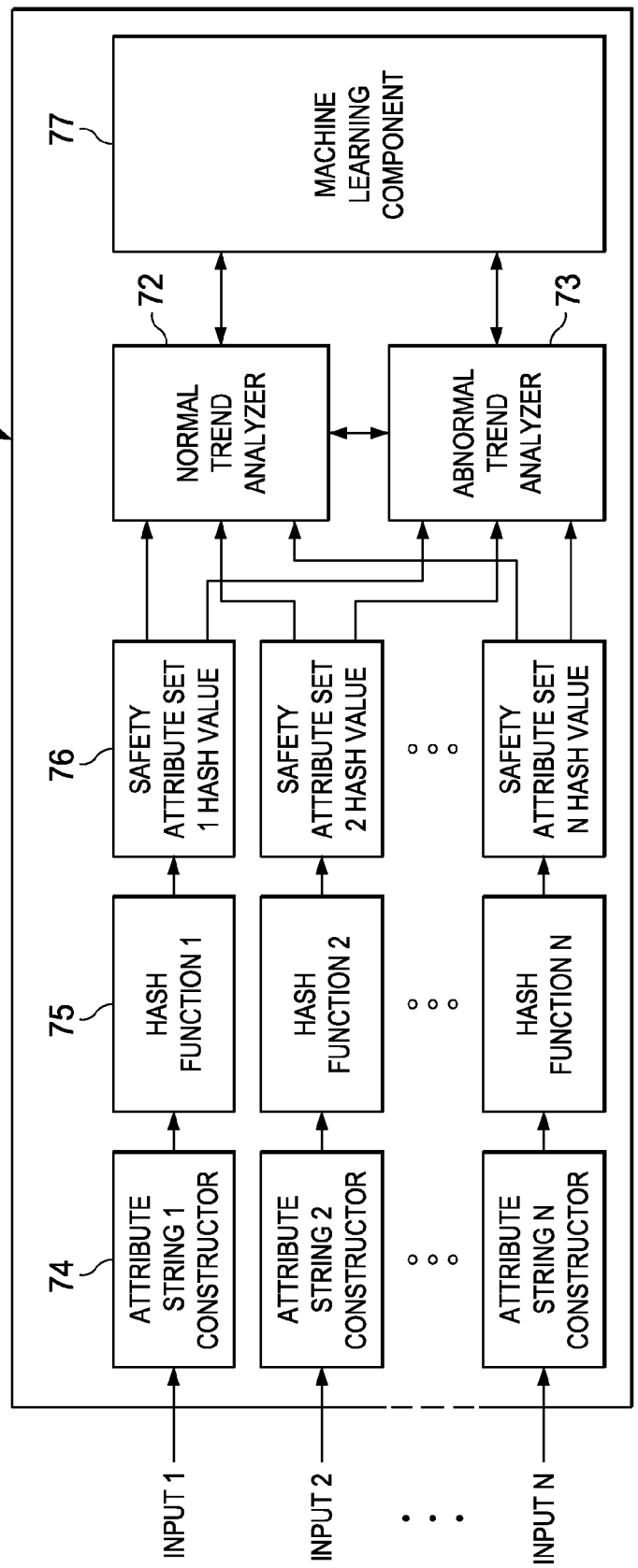

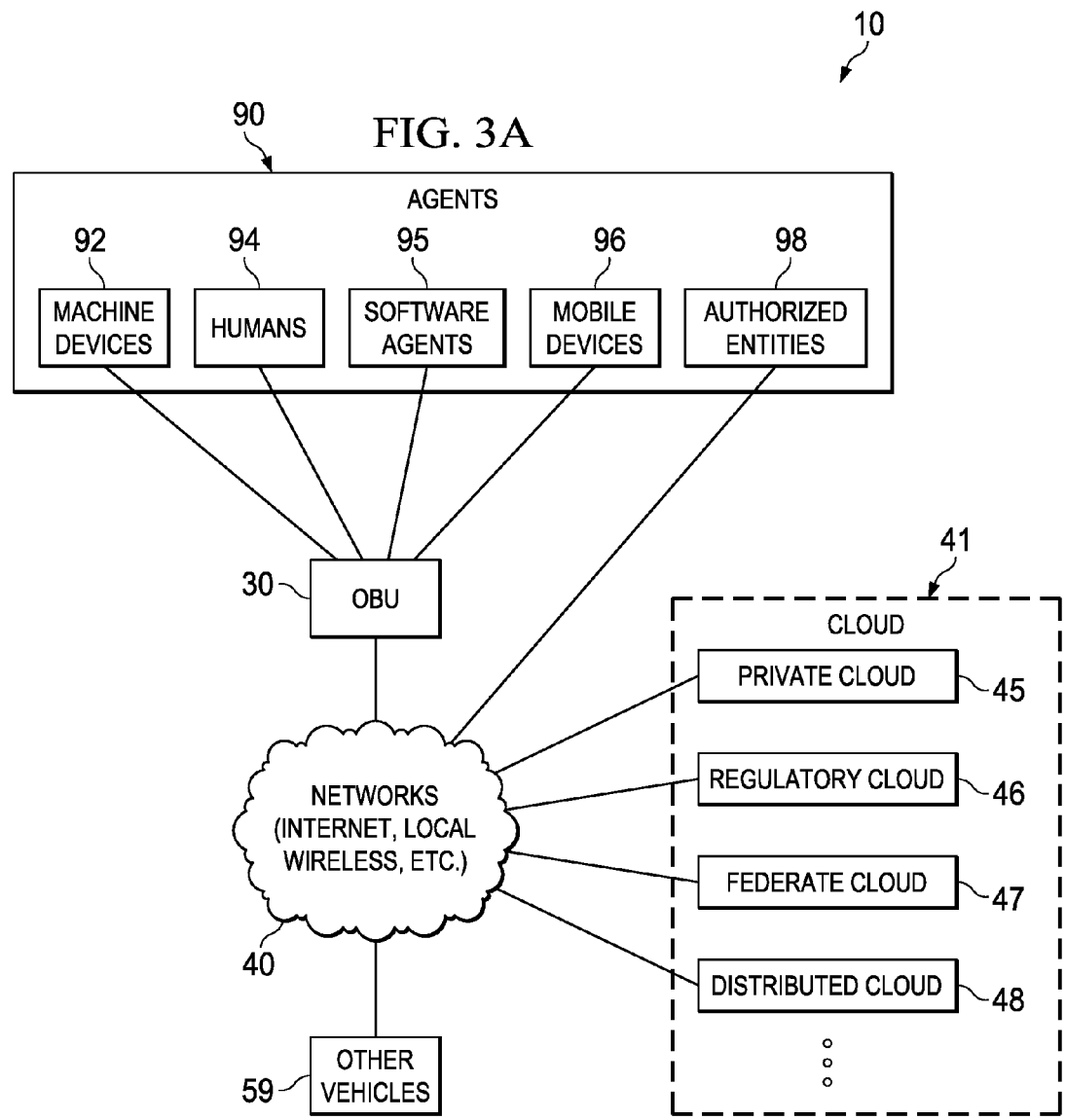

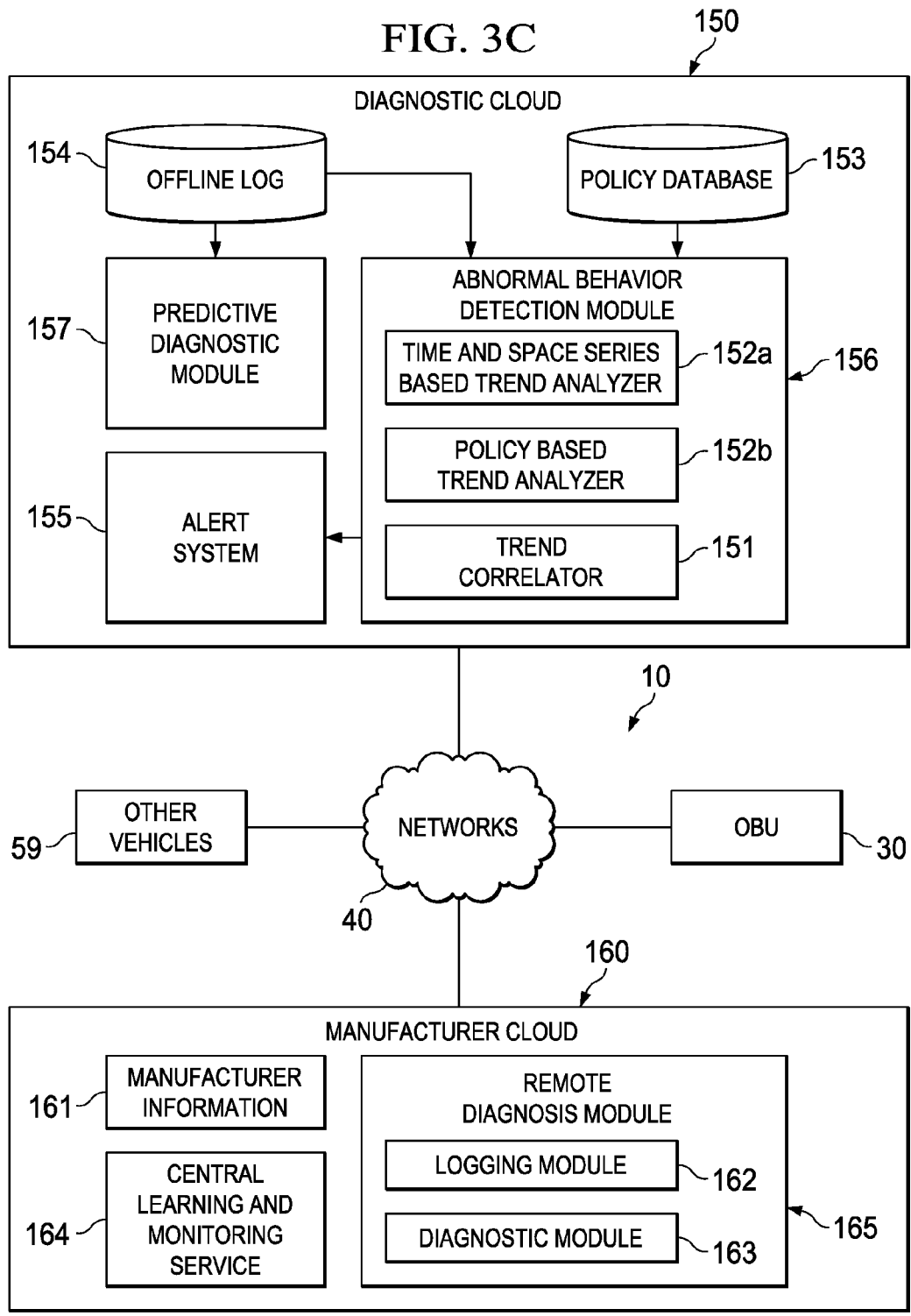

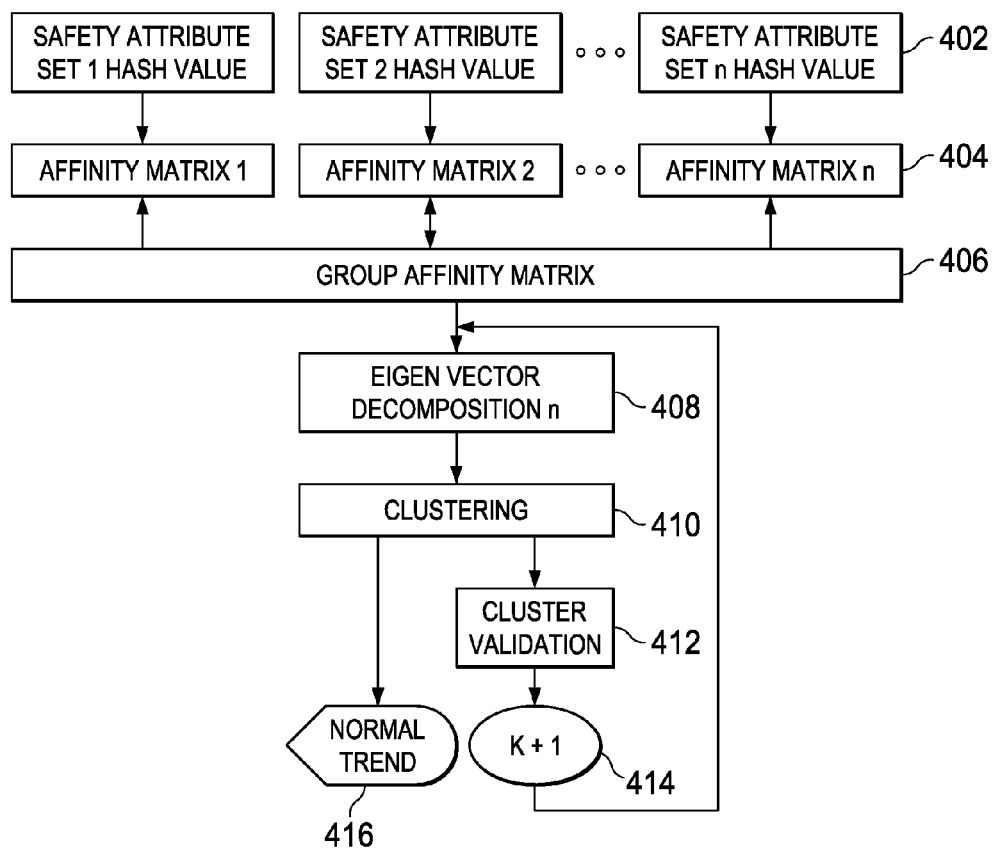

SYSTEM AND METHOD FOR ANALYZING VEHICULAR BEHAVIOR IN A NETWORK ENVIRONMENT

CROSS-REFERENCE TO RELATED APPLICATION

This application claims the benefit of priority under 35 U.S.C. §119(e) of U.S. Provisional Application Ser. No. 61/433,138, filed Jan. 14, 2011, by Sateesh K. Addepalli et al., entitled "SYSTEM, METHOD, AND PROCESSES ASSOCIATED WITH CONNECTED VEHICLES," which is hereby incorporated by reference in its entirety.

TECHNICAL FIELD

This disclosure relates in general to the field of electronic communications and, more particularly, to analyzing vehicular behavior in a network environment.

BACKGROUND

Networking architectures have grown increasingly complex and, further, have been designed for use in a wide variety of communications environments. Demand continues to rise among the subscriber base of end users, particularly so for network access across diverse network environments. In particular, configuring suitable network architecture for vehicular environments (e.g., automobiles, airplanes, trains, boats, etc.) presents unique difficulties. Vehicles can be mobile across a large geographic area, can have internal networks related to the vehicle itself, can include more than one end user at a time, and can have more than one owner during the life of the vehicle. Providing the ability to conduct safety and diagnostic management of these vehicles may present significant challenges to system designers, automobile manufacturers, service providers, and the like.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2A is a simplified block diagram illustrating possible example details that may be associated with embodiments of an on-board unit (OBU) of the communication system;

FIG. 2B is a simplified block diagram illustrating additional example details that may be associated with the communication system and with the OBU of FIG. 2A;

FIG. 3A is a simplified block diagram illustrating potential embodiments of a communication system in a network environment for analyzing vehicular behavior in accordance with the present disclosure;

FIG. 3C is yet another simplified block diagram illustrating further details of the potential embodiments of a diagnostic cloud and a manufacturer cloud shown in FIG. 3B;

FIG. 4 is a simplified block diagram illustrating further details that may be associated with embodiments of the communication system of the present disclosure;

DETAILED DESCRIPTION OF EXAMPLE EMBODIMENTS

Overview

A method in one example embodiment includes receiving a set of data in real time from each machine device of a plurality of machine devices associated with at least one vehicle in a consumer environment. The method also includes providing a set of reference data corresponding to a machine device of the plurality of machine devices. Additionally, the method includes comparing the set of data with the set of reference data. The method also includes detecting a deviation within the set of data from the set of reference data. Also, the method includes initiating an operation in response to detecting the deviation.

Yet another example embodiment includes receiving a plurality of behavior states associated with a plurality of machine devices in a plurality of vehicles and monitoring the plurality of behavior states. Additionally, the method includes identifying abnormal behavior in the plurality of behavior states. The method also includes determining whether the abnormal behavior exists in greater than a threshold number of vehicles of the plurality of vehicles. The method further includes initiating an operation if the abnormal behavior exists in greater than the threshold number of vehicles of the plurality of vehicles.

Example Embodiments

Figure 1:
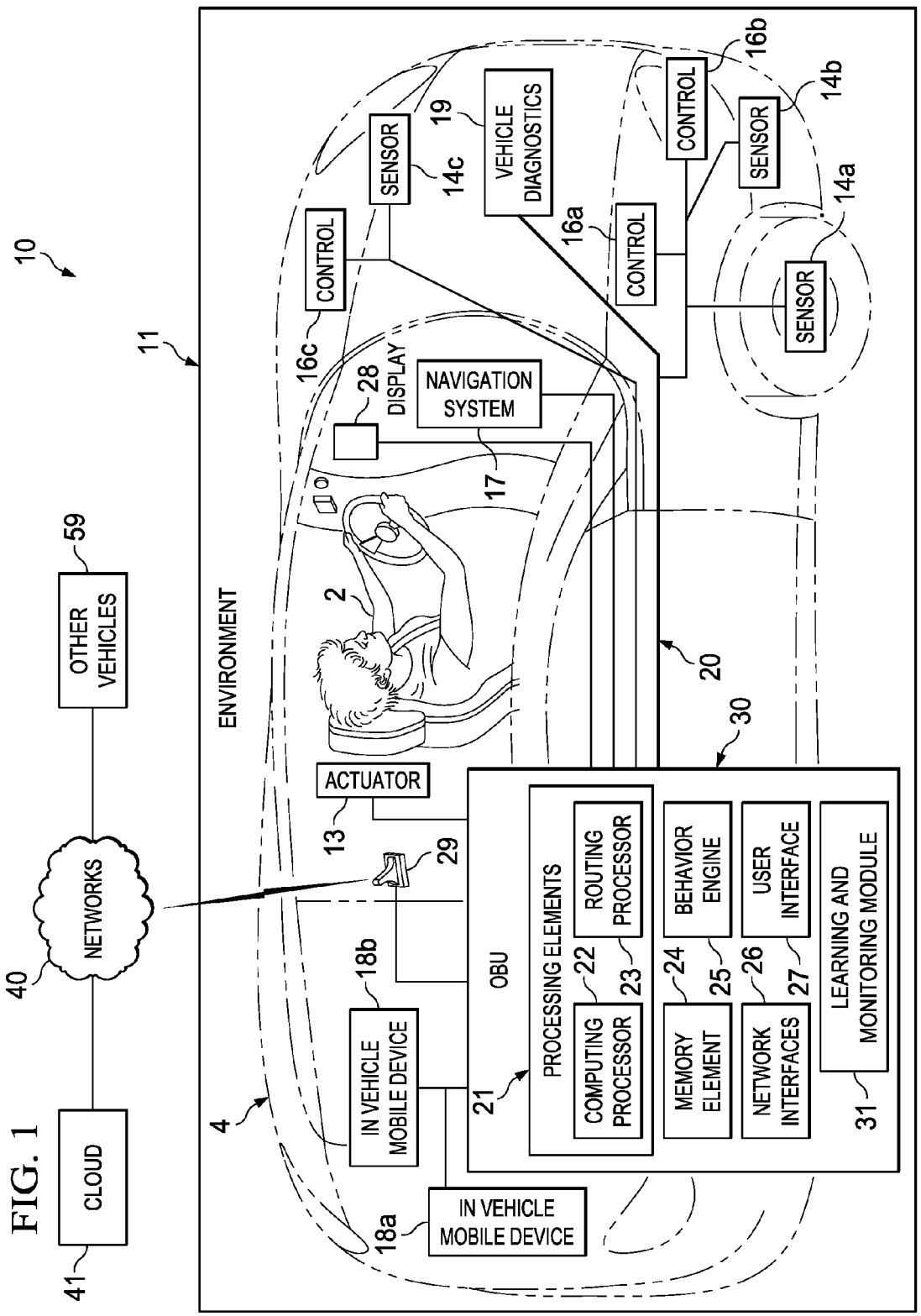
FIG. 1 is a simplified block diagram of a communication system for analyzing vehicular behavior in a network environment in accordance with one embodiment of the present disclosure.

Turning to FIG. 1, FIG. 1 is a simplified block diagram of a communication system 10 for analyzing vehicular behavior in a vehicular network environment. The example architecture of FIG. 1 includes an end user (driver) 2 operating a vehicle 4 in environment 11 that includes an on-board unit (OBU) 30. In this particular example, OBU 30 includes processing elements 21, which include a computing processor 22 and a routing processor 23. OBU 30 also includes a memory element 24, a behavior engine module 25, network interfaces 26, a user interface 27, and a display 28, where such devices may be associated with particular end users (passengers or driver) within vehicle 4. Generally, OBU 30 can be suitably coupled to numerous different nodes in communication system 10, where a node can be any device (e.g., a machine device or a mobile device), network element, client, server, peer, service, application, or other object capable of sending, receiving, or forwarding information over a communications channel in a network.

OBU 30 may be coupled to machine devices in communication system 10, such as a plurality of sensors 14a-c, a plurality of vehicle controls (e.g., electronic control units (ECUs)) 16a-c, and a plurality of actuators, such as actuator 13. In one example embodiment, sensors 14a-b and controls 16a-b may be part of an automotive diagnostic system, indicated by vehicle diagnostics 19, which may also be suitably integrated with OBU 30. OBU 30 may further include capabilities associated with navigation system 17 (e.g., a global positioning system (GPS)). OBU 30 may also be suitably coupled to various in-vehicle mobile devices 18a-b at any given time, where such devices may be associated with particular end users (passengers or driver) within vehicle 4.

FIG. 1 also includes networks 40, representing various types of connectivity to vehicle 4 (e.g., via antenna 29). Each established network of networks 40 may have a logical coupling to one or more remote nodes, including remote nodes of other vehicles 59 and various clouds 41. A 'remote node' as used herein may be any node located externally to a particular vehicle, such as vehicle 4. Examples of possible remote nodes that could be located externally to the vehicle include end user devices, mobile devices, network elements, electronic devices in networked systems (e.g., server in a datacenter, end user device in a local area network (LAN), etc.), OBUs of other vehicles, road-side infrastructure devices, and road-side user devices.

Elements of FIG. 1 may be coupled to one another through one or more interfaces (e.g., network interfaces 26) employing any suitable connection (wired or wireless), which provides a viable pathway for electronic communications. Additionally, any one or more of these elements may be combined or removed from the architecture based on particular configuration needs. Communication system 10 may include a configuration capable of transmission control protocol/Internet protocol (TCP/IP) communications for the electronic transmission or reception of packets in a network. Communication system 10 may also operate in conjunction with a user datagram protocol/IP (UDP/IP) or any other suitable protocol, where appropriate and based on particular needs. In addition, communication system 10 may also include a configuration capable of accommodating legacy bus subsystems 20 that may be employed to convey information across the myriad of machine devices (e.g., sensors 14a-c, controls 16a-c, actuator 13) in vehicle 4.

Embodiments of communication system 10 can enable analysis of vehicular behavior in a network environment, including on-board and remote behavioral analysis, remote diagnostics, abnormal behavior detection, and machine device behavior learning. An on-board unit (OBU) in a vehicle may be configured to facilitate collection of information associated with subsystems and the various associated machine devices (e.g., sensors, actuators, ECUs, etc.) of the vehicle to enable an analysis of vehicular behaviors in real time in a real world environment. The behavior engine module may be provided in certain embodiments to monitor network flows in the vehicular environment to detect abnormal trends of the vehicle. A predictive diagnostic technique in a cloud can substantially reduce or eliminate human bias and/or error in determining whether the safety of a vehicle has been compromised. Additionally, collected information can be used to create behavior state machines for each of the machine devices of the subsystems. These behavior state machines can be used as a reference for behavior of the associated machine device.

Certain terminologies are used with regard to the various embodiments of the present disclosure. The term 'road-side' as used herein is intended to mean outside of a vehicle and may or may not be physically located by a road. The term 'road-side infrastructure device' as used herein includes a base station, access point, satellite, and any device capable of establishing a network connection for exchanging packets between a user device or OBU and the Internet or other networks with remote nodes. In addition, 'user device' as used herein is intended to include mobile devices, personal computers, electronic devices, and any other device, component, element, or object operable by a user and capable of initiating voice, audio, video, media, or data exchanges within communication system 10. As used herein, the term 'machine device' is meant to encompass sensors, actuators, electronic control units (ECUs) or controls, instruments, embedded devices, media devices, infotainment systems, vehicle navigation systems, displays, other peripheral or auxiliary devices or components, etc. Machine devices may be physically distributed across the vehicle in a vehicle subsystem, consolidated in any way, provisioned in proprietary configurations, or otherwise configured based on particular networking, vehicle, and/or end user needs. Other terminologies are defined throughout the specification.

For purposes of illustrating the operational aspects of communication system 10, it is important to first understand the activities and problems that may be present in electronic communication scenarios in a vehicular environment such as the one shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Many useful, but disparate, networks may exist in today's vehicles (e.g., automobiles, airplanes, trains, boats, etc.). External networks may be accessed from a vehicle by certain electronic devices when a communication link is available. An 'external network' as used herein is intended to encompass a network that is external to a vehicle, where the network is a collection of nodes interconnected by communicative channels that facilitate electronic communications therebetween. For example, a mobile phone inside a vehicle may be used to access a 3G base station for connection to other mobile devices or the Internet.

In addition to wireless network communications external to a vehicle, multiple internal network subsystems (e.g., bus subsystems, IP networks) may exist in the vehicle to provide communication pathways to various machine devices distributed throughout the vehicle. A 'subsystem' as used herein is intended to encompass a network within a vehicle, where the network is a collection of nodes interconnected by communicative channels that facilitate electronic communications therebetween, in which the nodes are integrated with or otherwise linked to the vehicle. The nodes in internal network subsystems can include machine devices such as, for example, sensors, actuators, electronic control units (ECUs), detectors, entertainment systems including speakers, a CD and/or DVD player, a radio, etc. In addition, an internal network subsystem may exist for IP machine devices such as certain vehicle navigation systems (e.g., GPS) and any other machine devices configured for IP communications.

Other internal vehicular networks may also exist within a vehicle, and possibly be associated with simple content delivery. For example, mobile devices may be used within a vehicle to communicate with other electronic devices within the vehicle or with external networks of the vehicle (e.g., a mobile phone with 3G Internet connection). Hence, various levels of network usage, different purposes of network usage, and different agents (e.g., humans, machine devices, external devices, mobile devices) associated with the network usage may occur in a single vehicle. Network usage in each of the identified cases may have a different usage scope, different latency, different associated routing, different policy requirements, and the like.

Subsystems of vehicles typically include legacy bus subsystems (or subnets), each providing communication pathways to particular machine devices distributed throughout a vehicle. In a typical automobile, for example, more than 80 ECUs exchange data over and across these bus subsystems. Many of these subnets are segregated and thus, communication between the subnets is not feasible. Nevertheless, the number of ECUs and traffic exchanged between them is expected to continue to grow.

Vehicles employ a number of different bus subsystems to convey information across the myriad of sensors and actuators that are disseminated over a vehicle. Examples of typical vehicular bus subsystems include a Controller Area Network (CAN), which uses a message based protocol, designed for and typically used by automotive applications. The CAN bus is a vehicle bus standard designed to allow microcontrollers, sensors, and other devices to communicate with each other via the CAN (e.g., without a host computer). CAN may be used for soft real time control of devices such as the antilock braking system. Local Internet Network (LIN) may be used to sense external conditions such as light, or to control small mechanisms such as door locking systems. Yet another bus subsystem could include Flexray, a dedicated network for hard real time controllers, used for drive-by-wire and/or brake-by-wire applications in which information from the engine and/or the wheels is collected and transmitted to appropriate applications and/or data repositories. Media Oriented System Transport (MOST) can also be found in vehicles for transmitting audio, video, and voice on fiber optics. Some of these buses include vehicle-specific interconnects. Additionally, Ethernet may be used to interconnect machine devices in the vehicle.

A tension exists between isolation of the subnets for security purposes, and interconnection of the subnets for diagnostics, repairs, upgrades, data collection, and the like. Subnets are often physically and logically isolated in order to ensure the correct and secure operation of the vehicle. For instance, information from the Flexray bus (e.g., wheels and engine information) is not accessible over the MOST bus. Although such segregation may help to preserve security in certain cases, scattered functionalities across a vehicle and across different bus subsystems can increase costs, such as costs associated with diagnosing problems and maintaining the vehicle. Failures within a vehicle due to communication flows across the bus subsystems can be very complicated to diagnose when the vehicle includes many different subsystems with numerous different ECUs.

Recently there have been safety recalls by major vehicle manufacturers. Reports of unsafe manufacturing defects or unexpected malfunctioning of units resulting in accidents and, in some cases, loss of lives have been registered with safety authorities. There are uncertainties and controversies surrounding the real cause of accidents and deaths. A reliable automated predictive diagnostic technique is needed to substantially reduce or remove human bias/error in determining the safety compromise of a vehicle. This could provide all constituents, including public safety authorities, law enforcement entities, automobile manufacturers, and victims, unbiased data so that a fair assessment can be made.

In one example scenario, there is some controversy as to whether alpha particles may be at least partly responsible for certain vehicular malfunction. The potential disruptive effect of alpha particles on electronic circuitry (single-event upset [SEU], for instance) is well established, to the extent that in military and critical civilian applications, diverse protective measures are routinely taken. Some claims have been made that protective measures in vehicles, particularly automobiles, are inadequate against alpha particles. In particular, alpha particles are suspected as a potential cause of acceleration problems in some vehicles. The actual cause of such problems can be difficult, if not impossible to pinpoint after an accident or other catastrophic event. However, a predictive diagnostic technique, relying on both real time and historical data, may offer the potential to test hypotheses in an objective and systematic way. For example, a comprehensive collection of time-series acceleration data could help the study of alpha particles.

According to past US National Highway Traffic Safety Administration (NHTSA) estimates, in USA alone, 100,000 crashes per year (about 2% of all) are caused primarily due to driver physiological issues. These are in addition to hundreds of thousands of accidents and crashes due to other vehicle and driving environment related issues.

Techniques to effectively monitor vehicular network flows to identify deviant and/or abnormal network traffic in real time are lacking. Thus, incorporating automatic active vehicle safety techniques such as detecting changes in vehicle control system information, driver physiological signals, visual/radar/lidar based change detection in surrounding events/objects, information from networked sources, and employing alert systems, automatic feedback vehicle control systems, and other driver assist tools in vehicles may significantly help to prevent accidents and increase crash survivability.

Today's automobiles, in addition to other types of vehicles, are significantly more complex than in previous years. Today's vehicles are safer, smarter, more fuel efficient, environmentally friendly, and loaded with a plethora of comfortable features that make the ride enjoyable. There is also a relentless pursuit to add even more features and technology. Adding new features and technology, however, often causes increasingly complex technological challenges.

Modern day vehicles provide features of comfort, entertainment, and performance, for example, by employing extremely complex subsystems, including numerous ECUs that handle these tasks. In addition to being inherently complex, the interaction of these subsystems elevates the complexity of the whole system. Most of these subsystems employ some form of data communication and can have complex interactions with each other and with entities external to the vehicle. Generally, however, these communications are contained within the subsystems. Real time data is typically not available to the outside world unless the vehicle is operating under controlled and simulated test environments. There is an increasing need to collect and analyze information related to these subsystem operations and their interactions in real world environments in real time as opposed to primarily relying on evaluations and diagnoses of vehicles in controlled environments.

The different bus subsystems rely on the presence of gateways, deployed across different bus subsystems, or super-gateways deployed across multiple subsystems, to facilitate the exchange of data. The scattering of functionalities across a vehicle and the need for interconnection of the bus subsystems is driving costs up and there have been significant failures (leading to serious accidents) due to anomalies in the message flows across the different bus subsystems.

Increasing costs and significant failures could potentially be reduced with consolidation of the gateway and supergateway functions on a unified interconnection device. However, a major obstacle has prevented the industry from considering such a solution. Despite innovation in the automotive industry in recent years, a large number of legacy components (machine devices with software or hardware applications running on them) are still used in vehicles. In many cases, a complete specification of these legacy components is not available. While a general behavior and definition of a message sequence might be available, the actual and complete behavior is generally not available. These legacy components are usually not built by a vehicle manufacturer but instead by various original design manufacturers (ODMs) or original equipment manufacturers (OEMs). However, vehicle manufacturers usually define expected behavior of the component for the OEM. Once the vehicle manufacturer receives the component, it runs predefined tests to verify the component fulfills the requirements. Often, these specifications and tests are not complete, leaving uncertainties regarding the component behavior. This situation is even true for more modern parts. As a consequence, even changing a component provider/ODM can be problematic. Consolidating functionalities and replacing multiple buses by an alternative, such as Ethernet could require a major effort by the manufacturer to not only consolidate the specifications, but also to test multiple changes, new components, and their integration with existing parts in the vehicle. Without complete specifications of every component, such consolidation is a high risk project.

A mechanism by which the manufacturer can learn the full behavior of currently deployed machine devices within the vehicle is clearly needed. Such a mechanism could help a manufacturer to define a full specification for each machine device.

In accordance with embodiments disclosed herein, communication system 10 can resolve the aforementioned issues relating to analyzing vehicular behavior, including vehicular behavioral analysis, remote diagnostics, predictive diagnostics, and machine device behavior. Specifically, communication system 10 can utilize a fully integrated on-board unit (OBU) 30 to manage vehicular behavioral anomalies and machine device behavioral states. Even more specifically, an integrated on-board unit (OBU) 30 is configured for managing behavioral anomalies from vehicle 4 by receiving data, comparing the data to a reference set of data, and identifying any differences between the data and the reference set of data. Data can be identified according to any currently existing or later developed means. Furthermore, an OBU can utilize a learning and monitoring process to define machine device behavior specifications for each vehicle.

In further embodiments disclosed herein, a cloud-based platform may be accessed by a vehicle using available wireless network access options provided by OBU 30 (e.g., multiple wireless interfaces 26) and appropriate routing protocols. The cloud-based platform can provide dynamic, real time vehicle diagnostics from data provided by selected machine devices of the vehicle. Accordingly, vehicles with on-board units can provide data to a cloud for remotely managing behavioral anomalies of the vehicles and correlating the anomalies across multiple vehicles having defined similarities (e.g., model, type, parts, etc.). Additionally, a cloud-based platform can provide remote diagnoses of machine devices to assist in determining actual causes of particular malfunctions. Finally, cloud-based embodiments disclosed herein provide online monitoring and learning of vehicle component behavior based on interactions, combining learned behavior from many vehicles to derive a more complete behavior via a remote online service, updating vehicles with current behavior specifications, and monitoring behavior for failure detection and analysis.

Note that in this specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Furthermore, it should be appreciated by one skilled in the art that the words "optimize," "optimization," "optimum," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

Turning to the details of FIG. 1, end user 2 can be associated with a human agent (e.g., a driver or passenger) of vehicle 4. End user 2 may initiate communication in communication system 10 via some network of networks 40, and such communication may be initiated through any suitable device, inclusive of in-vehicle mobile device 18a or 18b, display 28, and navigation system 17, which could be integrated with OBU 30 and/or an infotainment system (not shown). In one embodiment, additional displays may be provided for one or more passengers in vehicle 4. Mobile devices, such as in-vehicle mobile devices 18a-b, are inclusive of mobile phones, smart mobile phones (smartphones), e-book readers, tablets, iPads, personal digital assistants (PDAs), laptops or electronic notebooks, portable navigation systems, multimedia gadgets (e.g., cameras, video and/or audio players, etc.), gaming systems, other handheld electronic devices, and any other device, component, element, or object capable of initiating voice, audio, video, media, or data exchanges within communication system 10. Data, as used herein in this specification, refers to any type of numeric, voice, video, or script data, or any type of source or object code, or any other suitable information in any appropriate format that may be communicated from one point to another in electronic devices and/or networks.

In-vehicle mobile devices 18a-b, and mobile devices external to vehicle 4, may communicate with OBU 30 of communication system 10 through any wireless or suitable wired communication link and may be configured as a personal area network (PAN) or a wireless personal area network (WPAN) or any other appropriate networking architecture or system that facilitates communications in a network environment. Wired and wireless communication links may be inclusive of any electronic link such as wireless technologies (e.g., Bluetooth, Zigbee, IEEE 802.11x, WiFi Direct, 60 GHz, ultrawideband (UWB), etc.), a USB cable, an HDMI cable, etc. Connection between mobile devices and OBU 30 may be configured based on particular needs and logistics. In one example, an external mobile device may be connected to OBU 30 through a USB cable or wireless network when, for example, the external mobile device is a diagnostic tool used by a mechanic for servicing vehicle 4.

Networks 40 represent external networks, which can be a series of points or nodes of interconnected communication paths for receiving, sending and/or forwarding packets of information that propagate through communication system 10. Networks 40 offer communicative interfaces between any of the components of FIG. 1 and remote nodes and other electronic devices of clouds 41 and other vehicles 59, for example. Networks 40 could be any local area network (LAN), wireless local area network (WLAN), wide area network (WAN), wireless wide area network (WWAN), metropolitan area network (MAN), wireless metropolitan area network (WMAN), wireless single hop or multi-hop vehicle-to-vehicle network, vehicle-to-vehicle-to-infrastructure network, virtual private network (VPN), Intranet, Extranet, or any other appropriate architecture or system that facilitates communications in a network environment. Networks 40 may include any suitable communication link to OBU 30 such as wireless technologies (e.g., IEEE 802.11x, 802.16, WiFi, WiMax, near field communications (NFC), DSRC, etc.), satellite, cellular technologies (e.g., 3G, 4G, LTE, GSM/WCDMA/HSPA, CDMA1x/EVDO, etc.), etc., or any combination thereof. Networks 40 may also include configurations capable of transmission control protocol/Internet protocol (TCP/IP) communications, user datagram protocol/IP (UDP/IP), or any other suitable protocol, where appropriate and based on particular needs.

Embodiments of OBU 30 may include one or more distinct interfaces, represented by network interfaces 26, to facilitate communication via the various networks (including both internal and external networks) described herein. Such network interfaces 26 may be inclusive of multiple wireless interfaces (e.g., WiFi, WiMax, 3G, 4G, white space, 802.11x, satellite, Bluetooth, LTE, GSM/WCDMA/HSPA, CDMA1x/EVDO, DSRC, GPS, etc.). Other interfaces represented by network interfaces 26, may include physical ports (e.g., Ethernet, USB, HDMI, etc.), interfaces for wired and wireless internal subsystems, and the like. Similarly, each of the nodes and user equipment (e.g., mobile devices) of communication system 10 can also include suitable interfaces for receiving, transmitting, and/or otherwise communicating data or information in a network environment.

In addition to multiple wireless interfaces (e.g., network interfaces 26), OBU 30 also includes wireless interface selection algorithms and appropriate routing protocols to enhance the wireless connectivity options to external networks from vehicle 4 (e.g., directly to roadside infrastructure devices, via single or multi-hop connectivity through other vehicles or nodes). Additionally, this configuration enables a substantial amount of connectivity between OBU 30 and external networks. Thus, OBU 30 is configured to provide consistent and reliable external network access from vehicle 4 through a mobile network infrastructure (e.g., 3G, 4G, LTE, etc.) and/or through other wireless technology infrastructures (e.g., WiFi, WiMax, other radio protocols, etc.).

Regarding a physical implementation of OBU 30 and its associated components, any suitable permutation may be applied based on particular needs and requirements, including the design of the particular vehicle in which OBU 30 is implemented. In example implementations, various other components of OBU 30 may be installed in different physical areas of the vehicle or may be installed as single unit, with display 28 being positioned to allow driver access. Other displays may be provided in suitable locations for access by passengers in particular passenger seats. In one implementation, multimedia, networking, and communication components may be positioned at some distance from the vehicle engine (e.g., in or near the rear or trunk area if the engine is in the front area of the vehicle).

Communication system 10 may be configured to facilitate communication with machine devices (e.g., sensors, instruments, electronic control units (ECUs), embedded devices, actuators, displays, etc.). OBU 30 may be implemented to provide one or more suitable communication interfaces (e.g., network interfaces 26) to legacy bus subsystems in vehicles such as, for example, a controller area network (CAN) a low speed network (LIN), a flexray communications protocol network, media oriented systems transport (MOST), and the like.

Typically, numerous ECUs, with different embedded software, may be found in a single automobile and may communicate via one or more internal network subsystems 20. Such subsystems 20 generally include legacy bus subsystems such as Controller Area Network (CAN), LIN, Flexray, and MOST. For example, vehicle controls 16a-b may be inclusive of any embedded system or ECU that controls one or more of the electrical subsystems in vehicle 4. Sensors 14a-b may represent wheel and headlight sensors respectively. Actuator 13 may represent a vehicle setting device such as a seat positioning device for adjusting various seat positions (e.g., longitudinal position relative to the brake and gas pedals, tilt position, lumbar support, etc.). Actuator 13 and other similar vehicle setting devices (e.g., temperature controls, sunroof, door locks, power windows, etc.) may be configured for communication via LIN internal network subsystem. Sensor 14c represents a type of sensor or device that may be configured for communications via flexray communications protocol (e.g., a radar collision sensor). Vehicle control 16c, representing one or more ECUs, may be suitably integrated for controlling the flexray network and sensors and other associated components.

Subsystems 20 may have alternative configurations in other embodiments, and may be suitably coupled to or integrated with OBU 30. For example, subsystems 20 may include a central hub that interconnects sensors, actuators, and controls and manages communications to and from OBU 30. In yet other embodiments, subsystems 20 could be partially or fully configured using Ethernet networking technology, or other suitable technologies enabling Internet Protocol (IP) communications, user datagram protocol (UDP) communications, or other suitable communications protocol for relaying packets across a network. OBU 30 may be configured to provide one or more suitable communication interfaces (e.g., network interfaces 26) to accommodate the possible implementations of subsystems 20, including interfaces for bus subsystems (e.g., CAN, LIN, Flexray, MOST), an IP network, a UDP network, or any other suitable protocol or communication architecture provided to enable network communication with machine devices in vehicle 4.

In the particular example shown in FIG. 1, vehicle 4 includes capabilities associated with navigation system 17 and vehicle diagnostics 19. Navigation system 17 may be provided in various embodiments including, for example, a portable navigation system or, alternatively, a fixed navigation system, each of which may be configured for wireless or wired communications to OBU 30. In other embodiments, navigation system 17 may be integrated with OBU 30, and navigation information such as maps and points of interest could be displayed for users on display 28. Other more specific machine devices, not shown in FIG. 1, may include display panel instruments, climate controls, interior lights, door locks, trunk open/shut actuator, hood open/shut actuator, seat heater and/or cooler, sunroof open/shut actuator, window heater/defroster/defogger, info/entertainment systems (e.g., speakers, radio, DVD, CD, etc.), and the like.

Behavior engine module 25 in OBU 30 may be configured to enable identifying anomalies in a vehicular network environment and, particularly, for analyzing vehicular hardware behavior and detecting unsafe behaviors. In one embodiment, behavior engine module 25 is a hardware based behavior analysis engine using content inspection and machine learning algorithms. Behavioral analysis engine 25 can find repetitions of certain attributes and generate a behavior curve within a configurable time window. An abnormal trend of the behavior curve can be detected in which unexpected repetition attributes occur.

Behavior engine module 25 may receive a set of data in real time from each machine device of a plurality of machine devices associated with at least one vehicle in a consumer environment. Data may be any data output from a machine device. In one example scenario, sensor 14*a* may transmit data indicating the brake has been applied on vehicle 4. The data may be a trend of responses from a machine device over time. For example, the data may represent that actual braking of vehicle 4 occurs each time at half a second after user 2 applies the brake.

The data may be collected in real time. Real time may be defined as the earliest amount of time that is reasonable to collect the data. For example, once the brake is applied, sensor 14*a* may take a short time to identify the brake was applied, convert braking signal information to data, and then send the data to an appropriate remote node of a cloud 41. So even though the data is not collected at the exact moment the brakes are applied, the data is still collected in real time that includes the delay for identification of the event for the sensor and data transmission.

Additionally, a consumer environment may be one example of environment 11. A consumer environment is one in which vehicle 4 is used by a consumer or user in a manner that is intended for vehicle 4 to be used. For example, the consumer environment for a traditional car may be roads and highways. Alternatively, the consumer environment for a tank may be rough terrain or a battlefield. A consumer environment is in contrast to a testing environment in which conditions may be controlled and vehicle 4 is not being used in a normal manner.

Furthermore, data may be collected from at least one machine device in at least one vehicle. OBU 30 of vehicle 4 may collect the data from a machine device of vehicle 4 and/or from machine devices of other vehicles 59.

Additionally, behavior engine module 25 may also be configured to provide a set of reference data corresponding to a machine device of the plurality of machine devices. The set of reference data may be a trend of previous data received from the machine device. For example, the set of reference data may be that each time a brake is applied by user 2 in vehicle 4, braking occurs after half a second. Also, the set of reference data may be a common trend based on a previous sets of data of the machine device in other vehicles. For example, data collected from other vehicles 59 may indicate that each time a brake is applied in each of other vehicles 59, braking occurs after half a second in each of other vehicles 59. Also, the set of reference data may be a common trend based on data from other machine devices of other vehicles similar to the machine device. For example, data collected from similar vehicles in other vehicles 59 may indicate that each time a brake is applied in each of the similar vehicles, braking occurs after half a second in each of the similar vehicles.

Additionally, behavior engine module 25 may also be configured to compare the set of data with the set of reference data. The data collected in real time may be compared in real time or at a later point in time to a reference set of data. Comparing the data may be done by behavior engine module 25 and/or by another processor in networks 40.

Behavior engine module 25 may also be configured to detect a deviation within the set of data from the set of reference data. The deviation may be user defined and/or set by behavior engine module 25. In different illustrative embodiments, the deviation may be identified by the use of an algorithm or analyzer program. For example, a deviation may occur when data coming from a machine device in real time indicates three seconds elapsed between user 2 applying the brake and actual braking operation. In contrast, if the reference set of data indicates a trend of only half a second lapses between applying the brake and an actual braking operation, no deviation may be detected.

Additionally, behavior engine module 25 may be configured to initiate an operation in response to detecting the deviation. A response may be an alert and/or an action. For example, if a delay in braking is detected, an alert may be sent to user 2 that there is a malfunction in the braking of vehicle 4. In addition to the alert, behavior engine module 25 may communicate with other systems in vehicle 4 to compensate for the delayed braking.

By initiating an alert and/or action, behavior engine module 25 may prevent catastrophic vehicular events and possibly save lives. User 2 may be able to react more quickly to danger or issues with vehicle 4. Additionally, vehicle 4 may be able to take action on behalf of user 2 and prevent an accident from occurring. By detecting changes in vehicle control system information, driver physiological signals, visual/radar/lidar based change detection in surrounding events/objects and consequently employing alert systems, automatic feedback vehicle control system and other driver assist tools into vehicles; behavior engine module 25 may prevent accidents from occurring.

Vehicle manufacturers may receive data from different behavior engine modules from all vehicles. Manufacturers may use this data to identify recalls or for improving a new model, for example, by aggregating the data and evaluating the collective data.

In addition to comparing machine device data to a reference set of data, behavior engine module 25 may also be configured to provide a policy with a set of rules. The policy could be, for example, a standard or preference indicated by a manufacturer or government entity. The set of rules may be specific elements as applied to the machine device. For example, in different illustrative embodiments, a safety policy may have a rule that an actual braking operation may not occur later than one second after a brake is applied by user 2 of vehicle 4

Additionally, behavior engine module 25 may also be configured to compare the data with the policy and detect a violation within the set of data of at least one rule of the set of rules. For example, in the braking scenario, if the policy indicates no more than a one second delay and the data indicates a real time detection of a two second delay, a violation is detected. In response to detecting the violation of the policy, behavior engine module 25 may initiate an operation such as an alert and/or a remedial action.

In addition to identifying deviations from trends and violations of policy, behavior engine module 25 may also adjust the reference set of data based on the set of data to form a new reference set of data when the deviation detected is within a range. For example, if data is received that a braking occurred three quarters of a second after the brake was applied, the reference set of data may be adjusted to include a delay of three quarters of a second as being part of the normal trend. A user, manufacturer, government policy, and/or algorithm may set the range. The range could be anything less than a second, half a second, or any other suitable range. By allowing the reference set of data to be adjusted, behavior engine model 25 may learn as it collects more data and becomes more accurate in identifying issues.

Learning and monitoring module 31 of OBU 30 may be configured to receive a plurality of data from the plurality of machine devices and identify a state from the machine device using the set of data. The set of data is in the plurality of data and the state is based on a behavior associated with the machine device. There may be multiple sets of data within the plurality of data. The plurality of data may be all data received from the machine device. Whereas each set of data may represent a different behavior from the machine device. For example, if sensor 14a is responsible for detecting braking, sensor 14a may have a set of data that corresponds to a brake being applied and a different set of data that corresponds to no brake applied. Learning and monitoring module 31 may receive each set of data and identify a state for each set of data. For example, a first set of data may be identified as a "brake applied" state and a second set of data may be identified as a "brake not applied" state.

By identifying different states for each machine device, learning and monitoring module 31 allows legacy systems to communicate with each other. Once a state is identified, that state may be sent to networks 40 and then used by other vehicles 59 and/or implemented in further coding of future systems. By all vehicles utilizing this process, behavioral states may quickly be identified.

Turning to FIG. 2A, FIG. 2A is a simplified block diagram illustrating one possible set of details associated with communication system 10. In this illustrative embodiment, machine devices 12 encompass sensors 14. Sensors 14 may monitor changes in vehicle control system information, driver physiological signals, visual/radar/lidar-based change in surrounding events/objects. For example, sensors 14 may monitor blood alcohol level of a driver, whether the eyes of the driver are open or closed, oxygen levels in vehicle 4, road obstacles such as potholes or objects, reaction times and functions of the different systems in vehicle 4, etc.

Sensors 14 may include data 42 and states 43. Data 42 may be the data sensors 14 detect in response to monitoring and transmit to OBU 30. For example, a sensor may identify that the eyes of the driver are closed. The sensor may then turn that information into data to transmit to behavior engine module 25 and/or to learning and monitoring module 31. (Learning and monitoring module 31 will be further described herein). Data 42 may represent all data transmitted from sensors 14. Within data 42 are states 43, which can be behavioral states. A set of data within data 42 may indicate a certain behavioral state is occurring. For example, a set of data within data 42 may indicate that an object is in the road. This set of data may be identified and associated with a state within states 43. Although sensors 14 are primarily shown and described herein, it will be apparent that other types of machine devices 12 such as ECUs or actuators, for example, may also have data and states associated therewith. Thus, the activities described herein are applicable to data from any type of machine device 12 providing suitable data for monitoring, identifying abnormal behaviors, diagnosing and predicting malfunctions, and/or learning behavioral states.

Behavior engine module 25 of OBU 30 can be configured to analyze data 42 from machine devices 12. In one embodiment, behavior engine module 25 may use time and space series based trend analyzer 32a and policy based trend analyzer 32b to identify anomalies/deviations within machine devices 12. With reference to analyzers 32a and 32b, 'time' refers to a date and possibly a time, and 'space' refers to a location.

Time and space series based trend analyzer 32a identifies and monitors trends in machine devices 12 over time. Time and space series based trend analyzer 32a may identify an anomaly within machine devices 12 when a piece of data indicates a deviation from past data received about that machine device or a similar machine device. Policy based trend analyzer 32b compares the trends and data from machine devices 12 against a policy and set of rules. Violations of those rules may be identified by policy based trend analyzer 32b.

Behavior engine module 25 may provide reference data 34 for time and space series based trend analyzer 32a and policy based trend analyzer 32b. Time and space series based analyzer 32a uses reference data 34 to compare data 42 with a relevant trend 35. Trend 35 may be a behavioral trend identified from a certain machine device of machine devices 12. For example, trend 35 may be the amount of times a driver blinks or the average length of time the eyes of the driver are closed.

Time and space series based analyzer 32a also uses reference data 34 to compare data 42 with common trend 36. Common trend 36 may be, for example, a common trend among similar machine devices or a common trend among the same or similar machine devices in similar vehicles.

Additionally, trend 35 may be based on which driver is currently in vehicle 4. A driver may be associated with a profile including, for example, particular physiological information associated with the driver. Accordingly, each driver may have a different standard of whether trend 35 is normal or abnormal. For example, one driver may react to road obstacles quicker than another driver. Thus, to take into account varying driver abilities, behavior engine module 25 may consider different profiles associated with different drivers.

Policy based trend analyzer 32b may use reference data 34 to change a policy or notify interested and authorized entities (e.g., manufacturers, government entities, etc.) of ongoing policy violations. For example, policy based trend analyzer may identify that a majority of drivers speed on certain roads. In response, the speed limit may be changed or more speed enforcement may be used on that road. Policy based trend analyzer 32b may also use policy 37. Policy 37 may be a governmental entity policy, a manufacturer policy, or any other appropriate type of policy based on particular needs and implementations. For example, policy 37 may be based on city ordinances such as speed limits and other laws and/or it may be based on manufacturer safety specifications. Policy 37 includes a plurality of sets of rules, represented by set of rules 38. Set of rules 38 may be the specific elements that apply to specific machine devices. For example, a rule may provide the maximum reaction time for a steering wheel to produce actual tire movement.

Additionally, behavior engine may include new reference data 39. When time and space series based trend analyzer 32a detects anomalies and deviations from trend 35, some of those anomalies may be normal reactions. When a reaction is normal and not one that needs an operation initiated, the data corresponding to the reaction is included in new reference data 39. To determine whether a deviation should trigger an operation or be included in new reference data 39, a range may be used. A range may be a distance in data from trend 35 in which data is still considered normal. The range may be set by a user, a manufacturer or other authorized entity, or by a computer using algorithms.

Behavior engine module 25 may communicate with feedback and active control module 33. Feedback and active control module 33 may initiate operations once an anomaly or a deviation from policy or trend analysis is identified. When an operation is initiated, an alert may be sent to different entities as well as a physical/mechanical action taken. The physical/mechanical action may include applying brakes to prevent an accident, shutting down vehicle 4, or any other suitable and authorized action.

OBU 30 may be connected to network 40. Network 40 may be one example of one implementation of network 40 as show in FIG. 1. Network 40 may be connected to cloud 41. Cloud 41 may provide processing and storage for data received from machine devices 12. Cloud 41 represents one or more clouds, such as private, public, or governmental networks including, for example, a data center/private individual cloud, a private cloud run by regulatory, a federated cloud, a distributed cloud, or any other appropriate type of cloud, which may be accessible by vehicle 4 via network 40.

Turning to FIG. 2B, FIG. 2B illustrates an example trend analyzer framework 70 that may be associated with time and space series based trend analyzer 32a and policy based trend analyzer 32b of behavior engine module 25. When trend analyzer framework 70 is implemented in OBU 30, inputs 1, 2, through n may be data received from sensors 14 or other machine devices 12 of vehicle 4. Attribute string constructors 74 receive the inputs 1-n and provide the time and space based map/representation of an attribute.

Attribute categories may include driver physiological information, image input, distance sensors, vehicle control system information, and information from networked sources. Driver physiological information may include blink rate, heart rate, perspiration level, body temperature, breath alcohol content, and EOG possibly taken at set intervals. Image input may be time series or space series from cameras (optical or infrared) or video recorders mounted on the interior or exterior of cars. Captured images may be processed to reveal information such as driver blink events, real time road/roadside objects, object motion, traffic condition, traffic lights, road signs and markings, and road condition (e.g. potholes, ice, etc.). Distance Sensors may include radars and lidars to detect objects or the distance from an object. Vehicle control system information may include, for example, speed, tire traction, stability information, RPM, temperatures, ignition advance, air flow rates, oxygen, throttle, coolant temperature, whether or not the fuel system is in closed loop operation corresponding to an <orientation, location, time>, etc. Information from networked sources may include data collected by sensors in other cars and road side sensors, alert signals, road construction information, real time police accident reports, weather reports, traffic information, traffic light information, and information about road signs, markings, and conditions. Information from networked sources may be sent to a vehicle via wireless means.

The map/representations of the attributes provided by attribute string constructors 74 may be provided to hash functions 75. Hash functions 75 may use a hash function (e.g., a summation value) to generate hash values to represent safety attribute sets 76 (attribute feature set strings). Counters may be used to keep track of repetition of the attribute feature set strings. Safety attribute sets 76 may then be analyzed by normal and abnormal trend analyzers 72 and 73, both of which may include time and space series based trend analyzer 32a and policy based trend analyzer 32b.

In many cases proper operating values of input parameters are known a priori in the policy based trend analyzer 32b (for both normal and abnormal trends). Any deviation from an acceptable range can constitute an abnormal event and may trigger an alert and/or feedback (e.g., via feedback and active control module 33). Example scenarios of abnormal events may occur if the speed of the vehicle exceeds a known speed limit by a threshold amount, if the breath alcohol content or driver's heart rate exceed an acceptable value, if the vehicle is approaching another vehicle or obstacle at a speed that could possibly cause a collision, if there are frequent crossings of lane markings, etc. Accordingly, policy based trend analyzer 32b can be configured to perform operations in accordance with an appropriate decision flowchart.

While the policy based trend analyzer 32b can capture abnormal events based on population averages, it may be unable to capture driver, environment, and situation specific abnormalities. For example, a 70 year old driver's physiological attributes is likely to be different from that of a 20 year old, and driving in a Canadian winter is likely to be different from driving in a Floridian summer. To improve alert and feedback accuracy, time and space series based trend analyzer 32b, which can be provided in both normal and abnormal trend analyzers 72 and 73, can provide intelligent trending analysis for specific drivers and his/her driving conditions. A trend curve can be constructed based on frequencies of each safety attribute set 76 and mapped using automatic clustering. Normal vehicle events can be detected by computing affinity matrices and applying eigenvalue decomposition to find clusters which represent normal behavior of the vehicle. Abnormal vehicle events can be detected by analyzing the conformity scores using various threshold weights. These weights may be dynamically configured using policies or using machine learning component 77 to reflect the learned normal behavior.

For each attribute type, behavior engine module 25 may keep track of normal trends versus abnormal trends and may provide appropriate alerts to a driver, auto commands to the control system to modify behavior of the vehicle for safety, alerts to external systems and entities using networks 40. For example, alerts may be sent to neighboring vehicles or roadside devices such as parking systems, assist booths, and the like using 802.11p. In another example, alerts or other safety information may be sent to cloud 41 (e.g., Safety Dept/OEMs/Insurance/Emergency Response system/Medical etc.) via, for example, WiFi, WiMax, 3G, 4G, or the like.

After normal and abnormal trend analyzers 72 and 73 have analyzed incoming data (e.g., sensor data), the output of the analyzers 72 and 73 may be analyzed by machine learning component 77 to increase the efficiency and optimize the analyzers. Machine learning component 77, for example, can train behavior engine module 25 by ingesting real data (e.g., data coming from various safety related sensors) and generating a normal curve for expected safe behavior. This normal curve can be deduced by a normal distribution of attribute counters used for repetitions. Training may occur continuously to avoid false positives or false negatives for deriving optimum thresholds. In addition, machine learning and classification techniques may be used to correlate events and smooth out a normal curve of attribute counters. During an active safety situation, abnormalities can be observed on real time data when long tail distortions with additional lumps (too high or too low) occur over normal curve due to unexpected repetitions in attribute counters.

Turning to FIG. 3A, an example embodiment of a cloud-based platform of communication system 10 is illustrated with OBU 30 shown coupled to agents 90 and networks 40. In one embodiment, agents 90 can include machine devices 92, humans 94, and mobile devices 96. In addition, agents can also include software agents 95 and authorized entities 98. Software agents 95 can include any application or executable file comprising instructions that can be understood and processed on a computer, and provisioned in a memory element accessible to OBU 30 (e.g., memory element 24), and which may be initiated automatically in response to a particular set of criteria or conditions (e.g., every time network connectivity is detected on OBU 30, whenever OBU 30 is powered on and a particular time interval has passed, in response to another software agent, etc.).

Authorized entities 98 may include various entities having authorization to access a vehicle 4 such as, for example, a dealer of the vehicle, a manufacturer of the vehicle, OEMs associated with the vehicle, and public entities having an interest in the vehicle (e.g., State Departments of Transportation, local police departments, etc.). A network node of such authorized entities will typically be remotely located from OBU 30 and, therefore, accessible from OBU 30 through networks 40 such as the Internet or other WANs and any available communication link (e.g., 3G, 4G, WiFi, WiMax, etc.) providing network access from OBU 30 to the Internet or other WAN. In some scenarios, however, OBU 30 may be locally accessible to an authorized entity such that Internet access is unnecessary. For example, when vehicle 4 is being manufactured and is located at one of the manufacturer's facilities, OBU 30 may be capable of accessing the manufacturer's network through a LAN or WLAN. Similarly, when a vehicle 4 is taken to a dealer for maintenance, the OBU 30 may connect to the dealer network through a communication link that does not include the Internet or any other wide area network.

The different architectural components of the cloud-based platform of communication system 10, as shown in FIG. 3A, may include wireless access, cloud computing, and data mining. A palette of wireless technologies, represented by networks 40, is available to vehicles with an OBU (e.g., through network interfaces 26): 3G, 4G LTE, WiFi, WiMax, DSRC, etc. Cloud computing may have embodiments, including, but not limited to various clouds 41 such as a data center/private cloud 45, a private cloud run by a regulatory agency 46, a federate cloud 47, a distributed cloud 48, or some other type of cloud. Networks 40 may facilitate communication between certain agents 90 (e.g., machine devices 92, humans 94, software agents 95, mobile devices 96) of OBU 30 and authorized entities 98, other vehicles 59, and the various clouds (e.g., private cloud 45, regulatory cloud 46, federate cloud 47, and distributed cloud 48).

Referring to clouds 41, a data center or private individual cloud 45 may be, for example, an instance when a car manufacturer runs either a distributed cloud or a private cloud-computing environment, which could be for its exclusive use. Given the sensitivity of the information involved, initial deployments could likely materialize in this way. Regulatory cloud 46 may be, for example, an instance when some of the streams from the fleet of connected vehicles are sent to a common cloud for processing. Federate Cloud 47 may be, for example, an instance when different car manufacturers keep their individual clouds, but share some vital information (either voluntarily or through mandates) in a common data pool, possibly accessible to agencies and researchers. Distributed Cloud 48 may be, for example, an instance when national/planetary coverage may demand a distributed/hierarchical organization for efficiency and responsiveness. In any one of these instances the cloud could provide not only processing but also short term storage and/or long-term storage of processed data and/or any related data computations. In addition, each of these clouds may include various network elements, computers, Internet connectivity, and any other suitable architecture or components capable of packet exchanges in a network environment.

Figure 3B:
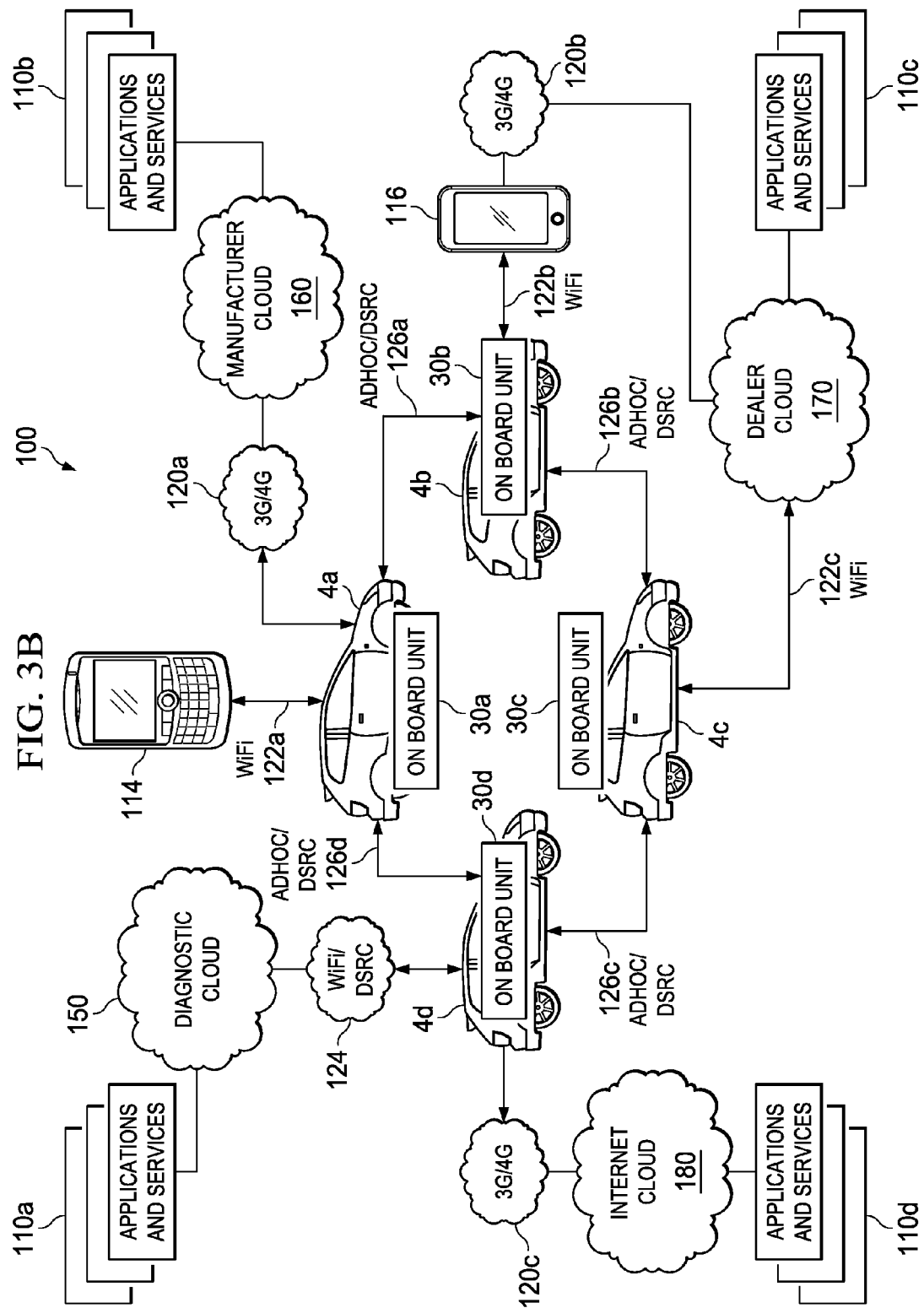
FIG. 3B is another simplified block diagram illustrating further details of potential embodiments of a communication system in a network environment in accordance with the present disclosure.

Turning to FIG. 3B, FIG. 3B is a simplified block diagram illustrating a network environment in which a cloud-based platform of communication system 10 may be implemented, with specific examples of possible clouds 41 in accordance with this specification. The example embodiment of FIG. 3B includes connected vehicles 4a-d in communication with applications and services 110a-d through various communication networks, including diagnostic cloud 150, manufacturer cloud 160, dealer cloud 170, and Internet cloud 180. Each of connected vehicles 4a-d may also be in communication with various mobile devices, such as in-vehicle mobile devices 114 and 116. In general, each connected vehicle 4a-d may include an on-board unit (OBU) 30a-d that can establish and manage communications over any viable pathway, including networks 40 such as 3G/4G networks 120a-c, WiFi networks 122a-c, WiFi dedicated short range communication (DSRC) 124, and ad hoc DSRC 126a-d, for example. Connected vehicles 4a-d with established peer links between OBUs via, for example, ad hoc DSRC 126a-d, may form a vehicular ad hoc network. Any one or more established communication links from any of OBUs 30a-d to a roadside infrastructure device (e.g., devices enabling connection to 3G/4G networks 120a-c, to WiFi/DSRC networks 124, etc.) may connect the vehicular ad-hoc network to a global network.

Each of OBUs 30a-d and associated vehicles 4a-d of FIG. 3B are intended to represent one or more embodiments shown and/or described herein with reference to OBU 30 and vehicle 4. Elements of FIG. 3B may be coupled to one another through one or more interfaces employing any suitable connection (wired or wireless), which provides a viable pathway for electronic communications. Additionally, any one or more of these elements may be combined or removed from the architecture based on particular configuration needs.

In various implementations, diagnostic cloud 150 could be a private cloud (e.g., a data center) associated with a third party independent of vehicle manufacturers or a regulatory cloud, and manufacturer cloud 160 could be a private cloud, for example. A manufacturer associated with manufacturer cloud 160 could also be an authorized entity 98 of one or more of OBUs 30a-d, with authorization and credentials for remotely accessing OBUs 30a-d. It will be apparent that any suitable arrangement or cloud configuration is possible and that the examples provided herein are for illustrative purposes. In another example, diagnostic cloud 150 could be a private manufacturer cloud with credentials and authorization to access certain vehicles and collect data from those vehicles as needed.

Turning to FIG. 3C, additional details that may be associated with diagnostic cloud 150 and manufacturer cloud 160 are illustrated. More specific examples of applications and services 110a and 110b of diagnostic and manufacturer clouds 150 and 160, respectively, are shown. Moreover, any one or more of the elements shown and/or described with reference to FIG. 3C could be implemented in a network element (e.g., a server, etc.) or other suitable device, element or object capable of exchanging packets in a network environment. In addition, memory elements may be included in diagnostic and manufacturer clouds 150 and 160, respectively, for storing various data related to the functions described with reference to diagnostic cloud 150 and manufacturer cloud 160.

In the example embodiment of FIG. 3C, diagnostic cloud 150 includes data mining components in an abnormal behavior detection module 156. Abnormal behavior detection module 156 can include time and space series based trend analyzer 152a and possibly a policy based trend analyzer 152b for detecting both abnormal and normal trends. Abnormal behavior detection module 156 may also include a trend correlator 151 for correlating diagnostic data across multiple vehicles of a given type and model, for example, in order to identify abnormal behavior. An alert system 155 and a policy database 153 may also be included in diagnostic cloud 150. Policy database 153 may include polices issued by humans 94, software agents 95, clouds 45-48, authorized entities 98, or any other suitable and authorized policy creator. Alert system 155 may be configured to alert any appropriate entity of a detected vehicular problem (e.g., manufacturing defect, vehicle malfunction, etc.), including alerts to an owner, a manufacturer or OEM, and/or safety authorities.

Abnormal behavior detection module 156 may also include a predictive diagnostic module 157 for determining actual causes of malfunctions of vehicles. Predictive diagnostic module 157 can substantially or completely remove human bias and/or error in determining whether the safety of a vehicle has been compromised.

In one embodiment, diagnostic data from vehicles can be sent directly to modules 156 and 157 for real time processing. In another embodiment, an offline log 154 may also be provided in diagnostic cloud 150, where real time data from vehicles is stored and then later accessed by abnormal behavior detection module 156 and predictive diagnostic module 157. In other embodiments, a combination of real time processing and delayed processing may be employed. Interface adapters may be provided by abnormal behavior detection module 156 and predictive diagnostic module 157 (or an associated device) to connect to offline log 154 as well as to online data from vehicles over networks 40.

In one embodiment, manufacturer cloud 160 may include manufacturer information 161, remote diagnosis module 165, and central learning and monitoring service 164. Manufacturer cloud 160 may supply manufacturer information 161 to diagnostic cloud 150. For example, manufacturer information 161 may include templates indicating a type of car, a model of car, expected normal behaviors, and the like. A plurality of templates may be available for each car indicating various expected normal behaviors and acceptable parameter ranges. These templates along with safety defect information may be provided to time and series based trend analyzer 152*a* and policy based trend analyzer 152*b* of diagnostic cloud 150. Manufacturer cloud 160 may contact other vehicles 59 through networks 40, examples of which are shown in more detail in FIG. 3B, to relay safety information received from diagnostic cloud 150. Manufacturer cloud 160 may also improve future vehicle designs based on information received from diagnostic cloud 150.

In operational terms, there is a need to systematically, automatically, and objectively assess the functioning of cars, particularly from the point of view of safety. To effectively perform this assessment, a system that detects and alerts on car anomalies may include: an ability to reliably and continuously monitor key performance metrics; an ability to correlate current measurements with historical ones of the same vehicle; an ability to cross-correlate current and historical measurements across different cars, including cars within the same category (e.g., brand, model) as well as different categories and prototype behaviors; versatility and future proof so that as connected vehicle technology evolves, the system can incorporate new measurements and features; objectivity so that the systematic processing of large amounts of data can lead to error-bar based assessments; and responsiveness because post-mortem assessments are important, but timely response is even more important in life-threatening situations. The system could have the ability to react promptly with corrective actions in the offending vehicle, and/or to provide external support.

The illustrative embodiments draw from advances in sensors, wireless technology, data center/cloud computing, and data mining/machine learning to build an adequate cloud-based platform of communication system 10. The illustrative embodiments may be configured as an evolvable platform, able not only to accommodate new advances and increasing demands from vehicle technology, but also to stimulate further development of applications that can increase vehicle safety.

The goal of the cloud-based platform embodiment is not only to serve current needs but also to stimulate innovation on applications. Hence, the descriptions of embodiments herein are merely illustrations of the power of the cloud-based platform rather than a complete description of its capabilities.

The actual cause of a vehicular failure can be difficult, if not impossible to pinpoint after an accident or other catastrophic event. However, a predictive diagnostic technique, relying on both real time and historical data, may offer the potential to test hypotheses in an objective and systematic way. For example, a comprehensive collection of time-series acceleration data could help the study of various suspected problems. In the example case of suspected alpha particles, previously described herein, relevant studies could include acceleration patterns (motifs) along the time-series of a single car, common patterns across same-model cars, and common patterns across different brands of cars sharing the same supplier.

Data mining and knowledge discovery may also be supported by the embodiments of a cloud-based platform disclosed herein. For example, because appropriate sensors may capture simultaneously pressure on the brakes and actual deceleration, time-series analysis may allow conclusions to be drawn on anomalous patterns. Although the predictive diagnostic techniques disclosed herein can be particularly useful for detecting anomalies in vehicular behaviors related to safety, such techniques may also be applied to numerous other aspects of vehicular behavior (e.g., infotainment system functionality, heating and cooling functionality, etc.).

Consider two competing solutions to the same problem. For illustrative purposes, suppose that two solutions have been proposed to use the interaction between vehicles and traffic lights to increase safety and energy savings. A regulatory agency seeking a wide scale deployment may be interested in a full, objective assessment of the two technologies. Such an assessment may require more than a functional prototype scenario; it may require consistent real life assessment over prolonged periods. The proposed embodiments can enable such an assessment by collecting and evaluating data from two deployments in similar locations of the competing technologies. The cloud-based embodiment of FIGS. 3B and 3C supports diagnostics of vehicular behaviors in diagnostic cloud 150.

Abnormal behavior detection module 156 can work on real time data coming from vehicles (e.g., OBU 30) via networks 40 or from stored offline log 154 that is later fed into or retrieved by abnormal behavior detection module 156. Abnormal behavior detection module 156 provides interface adapters to access data in offline log 154 as well as to the online data from a vehicle over an IP network.

Trend analyzer framework 70, previously shown and described herein with reference to FIG. 2B, may be used with time and series based trend analyzer 152*a* and policy based analyzer 152*b* of diagnostic cloud 150. When trend analyzer framework 70 is implemented in a diagnostic cloud 150, however, inputs 1, 2, through n may be diagnostic streams from numerous vehicles, rather than a single vehicle.

In this case a feature set (e.g., safety attribute set 76) of trend analyzer framework 70 could be a specific diagnostic parameter over a time series or space series. The trend analyzer can cluster the data originating from a given vehicle or from multiple vehicles. Additionally, a definition of a normal operating trend of a vehicle can be derived by training the model using the normal operating constraint thresholds of a given vehicle based on its type and model.

If an abnormal trend is detected in the trend analyzer framework 70, then the abnormal trend data may be provided to trend correlator 151 to evaluate with reference to multiple vehicles of the same type and model, for example. Detecting a manufacturing defect from abnormal behavior data can be achieved by observing an abnormal behavior pattern across multiple vehicles of the same type and make using correlation techniques of trend correlator 151, for example. If a threshold number of vehicles show a similar abnormal behavior trend, this likely indicates a manufacturing defect.

Malfunction detection of abnormal behavior is detected by identifying whether the abnormal behavior trend is observed on a specific vehicle over a time and space series and has a correlation with that of other vehicles. If there is no correlation, then it is likely that some of the components in the vehicle are malfunctioning.

Once abnormal behavior is detected through the above technique, a safety alert may be sent to the vehicle owner, dealer, OEM and in some cases safety authorities based on the policy setup provided to the framework. An alert medium could include email, SMS, phone call, or any other suitable Internet based messaging scheme.

In a particular embodiment, a diagnostic framework of predictive diagnostic module 157 in diagnostic cloud 150 may include two parts: a statistical feature extraction and tracking of OBD-II/CAN/Vehicle control system parameters such as speed, RPM, temperature, ignition advance, air flow rate, oxygen, throttle, coolant temperature, status of fuel system (e.g., whether or not in a closed loop operation) corresponding to an orientation, a location, and a time; and a spectral clustering for automatically clustering normal behaviors. The statistical feature extraction technique may be based on trajectory, hidden Markov model (HMM), and histograms. In spectral clustering, normal vehicle events may be detected by computing affinity matrices and applying eigenvalue decomposition to find clusters that represent normal behavior of the vehicle. Abnormal vehicle events may be detected by analyzing conformity scores.

In addition to vehicle diagnostic and safety analysis, there is a demand for remote diagnosis of vehicle conditions for improvement on future vehicles. Some of the most common networks used in the modern automobile are CAN, LIN, MOST, and Flexray as previously described herein. Each has specific characteristics and advantages tailored for their specific application. Each of these subsystems operates in their own domain with no outside observability unless operating under a controlled environment. Interactions among the subsystems are essential and inevitable for proper operation of the overall system. These interactions, when coupled with numerous real world operating conditions, however, give rise to numerous possible scenarios that cannot be completely covered in a test environment.

In embodiments disclosed herein, OBU 30 can act as a gateway with routing capabilities (e.g., routing processor 23) and multiple wireless interfaces (e.g., network interfaces 26) for all heterogeneous subsystems to communicate with the outside world in real time. Also, the illustrative embodiments conceptualize a mechanism to carry internal communication (e.g., from the subsystems) to transport over gateway communication protocols that enables these internal subsystem transactions to be captured, logged, and analyzed in remote location. In one example implementation, manufacturer cloud 160 can receive internal subsystem transaction data and perform logging and analysis functions related to such data. Moreover, internal subsystem transaction data may be captured by OBU 30 and sent to manufacturer cloud 160 in real time.

Remote diagnosis module 165 of manufacturer cloud 160 may include a logging module 162 and a diagnostic module 163. Data captured by OBU 30 may be sent to remote diagnosis module 165, where it is logged in logging module 162. In addition, analysis of the captured data can be performed by diagnostic module 163.

Real time data collection of a vehicle operating in real world conditions can bring a far better understanding to the behavior of the subsystems and their interactions among them, which can lead to better and more robust designs of those subsystems. These efforts may also improve productivity of vehicle designers, engineers, and the like.

Real time data collection can also allow manufacturers and service departments to collect data from a vehicle under claimed impaired operation. Manufacturers and service departments may no longer have to rely either upon a complaint or a lab sample trying to reproduce the claimed failure under simulated conditions. This concept can be expanded to collect and analyze data from several real world ongoing operations to make statistically meaningful observations and conclusions. When these concepts are coupled with pattern recognition and preemptive actions on the part of manufacturers, the illustrative embodiments can empower the manufacturers to be proactive in recognizing and acting upon any impending issues before these issues escalate.

The scattering of functionalities, leading to multiple bus subsystems and many ECUs with OEM dependant software running on them has led to increasing costs for vehicle manufacturers. While each device is rigorously tested, testing the integration of these subsystems is more complicated. In order to consolidate these functionalities and bus subsystems, it is important to have a more complete behavior specification, perhaps in the form of a state machine, of every device built by OEMs. Additionally, the processor may benefit from recognizing states instead of deciphering sets of data.

In order to address this issue, learning and monitoring module 31 of OBU 30 with probes in all bus subsystems can be integrated into today's vehicles. This module could be implemented as part of OBU 30. The first phase is for learning and monitoring module 31 to passively monitor interactions and messages passed between ECUs or other machine devices connected to each bus and across the bus subsystems. Learning and monitoring module 31 gradually learns the behavior of each device and, accordingly, a behavior state machine may be built for each monitored device. Although algorithms have been proposed to build state machine behavior from predefined interaction specifications, in this case, monitoring and learning module 31 gradually builds a behavior specification of all monitored machine devices from observed interactions at runtime, which can be in a real world environment.

The illustrative embodiments are different from current methods on monitoring and learning in that current methods focus on monitoring physical parameters of a vehicle such as speed, acceleration, gas consumption, etc. In contrast, the illustrative embodiments herein can monitor interactions of desired machine devices, to gradually learn their behavior logic and to build a state machine for each machine device that could potentially emulate its behavior. Furthermore, the illustrative embodiments may monitor the correlation of these machine devices with respect to each other. For instance, a safety requirement could be when both gas pedal and brake pedal signals are active at the same time, the brake pedal signals should have higher priority and override the gas pedal signals. This is an example of a correlation of interactions within the vehicle network of subsystems. In this example scenario, a monitoring device that has an emulator state machine for the behavior of both of these subsystems can inject the appropriate messages on the bus to enforce such safety requirements. Furthermore, the illustrative embodiments are different from current methods in that the behavior learned through the monitoring and learning process is used as an input for firewall and flow control modules to detect anomalies with respect to expected behavior.

Additionally, a remote online service, for example a manufacturer data center or manufacturer cloud 160, can be used to consolidate learned behavior from many vehicles to achieve a union of all possible interactions and message sequences and further refine the behavior. Every newly discovered interaction or state in a vehicle may be communicated via various channels (e.g., wireless channels from OBU 30 if available, dealership during a service, etc.) to manufacturer cloud 160, which can include central learning and monitoring service 164. Central learning and monitoring service 164 can consolidate the new behavior with the previously learned behavior, and push updated behavior knowledge to vehicles through wireless channels, for example. The learning phase may continue its operation and gradually approach complete behavior. The rate of detecting new behavior could be a measure of how close the learned behavior is to a complete behavior specification.

A behavior state machine can be generated for each of the observed machine devices. As a behavior state machine becomes more complete over time, it can be used as a reference behavior for an associated machine device. Behavior state machines can be used to automatically combine behavior of multiple machine devices. While the learning cycle continues to detect new special cases and update reference behavior, it can also be used to detect deviations from expected behavior. These deviations can be analyzed in manufacturer cloud 160 (e.g., by central learning and monitoring service 164) to decide whether to classify the deviations as accepted behavior or as failures.

For example, after a certain threshold, newly detected interactions or states can trigger a flag in central learning and monitoring service 164 to perform further analysis to make sure the detected behavior is an accepted one. Potentially unwanted behavior can be detected as part of this process. If an unwanted interaction or state is detected and confirmed to be defective, mitigation can be designed and can be pushed by central learning and monitoring service 164 to any relevant vehicles. Simple mitigations could, for example, instruct learning and monitoring module 31 of OBU 30 to inject a message on the bus if a machine device enters a defective state. More complicated issues could employ a software update of a machine device.

This technique enables the manufacturer to approach a complete behavior specification of machine devices built by OEMs, via collecting cumulative information from millions of vehicles during real time operation. It also allows the manufacturer to monitor these machine devices during run time and, if a deviation from expected behavior is detected, mitigations can be designed and pushed back to any vehicles that could potentially incur such defects.

The learned behavior can also be used towards consolidation of functionalities and devices, or to refine the machine device specification requirements that are passed to the OEMs. This could be especially useful when a manufacturer is changing OEMs for a specific device. It can also help to build more realistic and comprehensive tests for the machine devices. Additionally, formal methods and model checking could also be used to prove/ensure safety properties in derived behavior state machines.

This technique proposes monitoring and learning machine device behavior based on interactions, combining learned behavior from many vehicles to derive a more complete behavior specification in a remote online service, updating each vehicle with the most current behavior specification from the central online learning and monitoring service 164, and leveraging the learned behavior to monitor devices for failure detection and analysis, and potentially designing mitigations that can be pushed to vehicles via central online learning and monitoring service 164. Learning and monitoring module 31 of OBU 30 could potentially implement these mitigations, providing an efficient means for reacting to detected failures in vehicles.

Turning to FIGS. 4 through 8, simplified flowcharts illustrating various aspects of embodiments of the present disclosure are shown. For ease of reference, FIGS. 4 through 8 will be described herein with reference to various elements, objects, modules, and components of the present disclosure as provided in preceding FIGS. 1 through 3.

FIG. 4 is a high level data transmission flow 400 providing example steps of a specific embodiment of time and space series based trend analyzers 32a and 152a for identifying a normal trend. Data transmission flow 400 begins at step 402 where attribute string constructor 74 provides a time and space based map/representation of the attribute and hash function 75 uses a hash function such as a summation value to represent safety attribute set 76. The flow then moves to step 404 where an affinity matrix is applied to each summation value representing safety attribute set 76. The affinity matrices are combined into a group affinity matrix in step 406.

Once the group affinity matrix is complete, Eigen vectors are applied to the group affinity matrix in step 408. The flow then proceeds to step 410 where clustering is performed. During clustering, natural groupings and input patterns are identified. These can be correlated against training data or reference data for normal trend identification. If the clustering is not sufficient, the flow moves to step 412 where the clustering analysis is validated. Once validated, the flow passes to step 414 where another round of Eigen vectors and clustering analysis is applied to the data. If the clustering is sufficient, a normal trend is identified in step 416.

Figure 5:
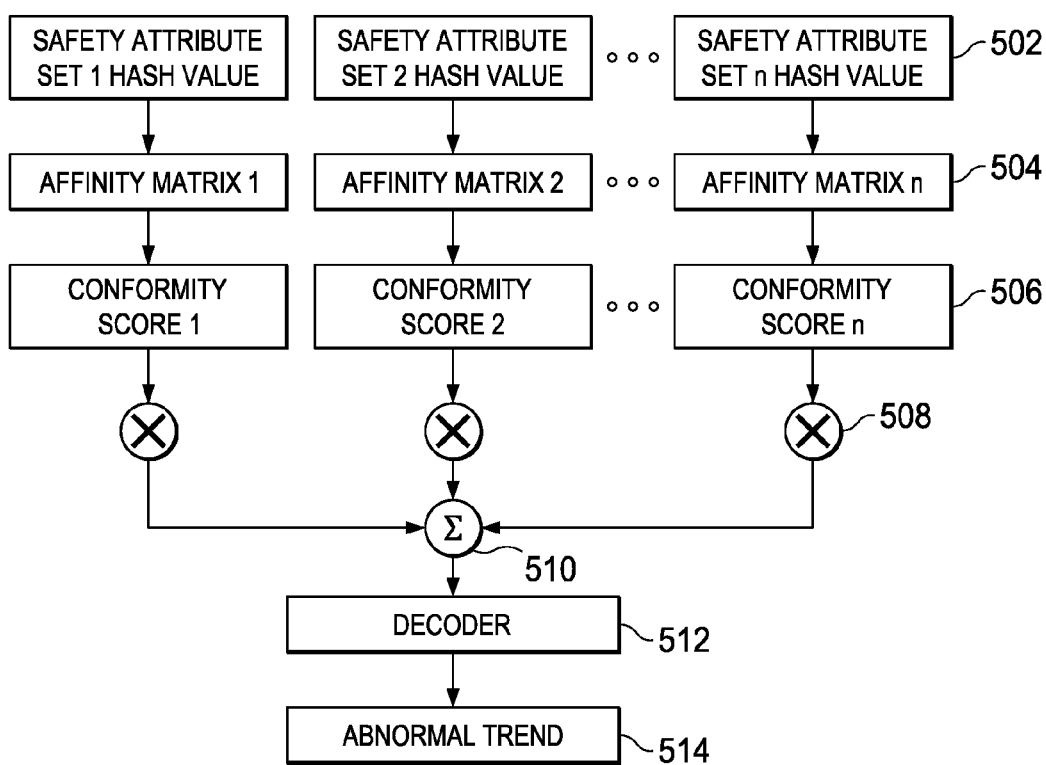
FIG. 5 is another simplified block diagram illustrating yet further details that may be associated with embodiments of the communication system of the present disclosure.

FIG. 5 is a high level data transmission flow 500 providing example steps of time and space series based trend analyzers 32a and 152a for identifying an abnormal trend. Data transmission flow 500 begins at step 502 where attribute string constructor 74 provides a time and space based map/representation of the attribute and hash function 75 uses a hash function such as a summation value to represent safety attribute set 76. The flow then moves to step 504 where an affinity matrix is applied to each summation value representing safety attribute set 76.

The flow then proceeds to step 506 where abnormal vehicle events can be detected by analyzing conformity scores using various threshold weights. These weights can be dynamically configured using policies or using machine learning to reflect the learned normal behavior. Step 508 applies the weights and step 510 sums the input strings. A decoder in step 512 identifies any abnormal trends that are output in step 514.

Figure 6:
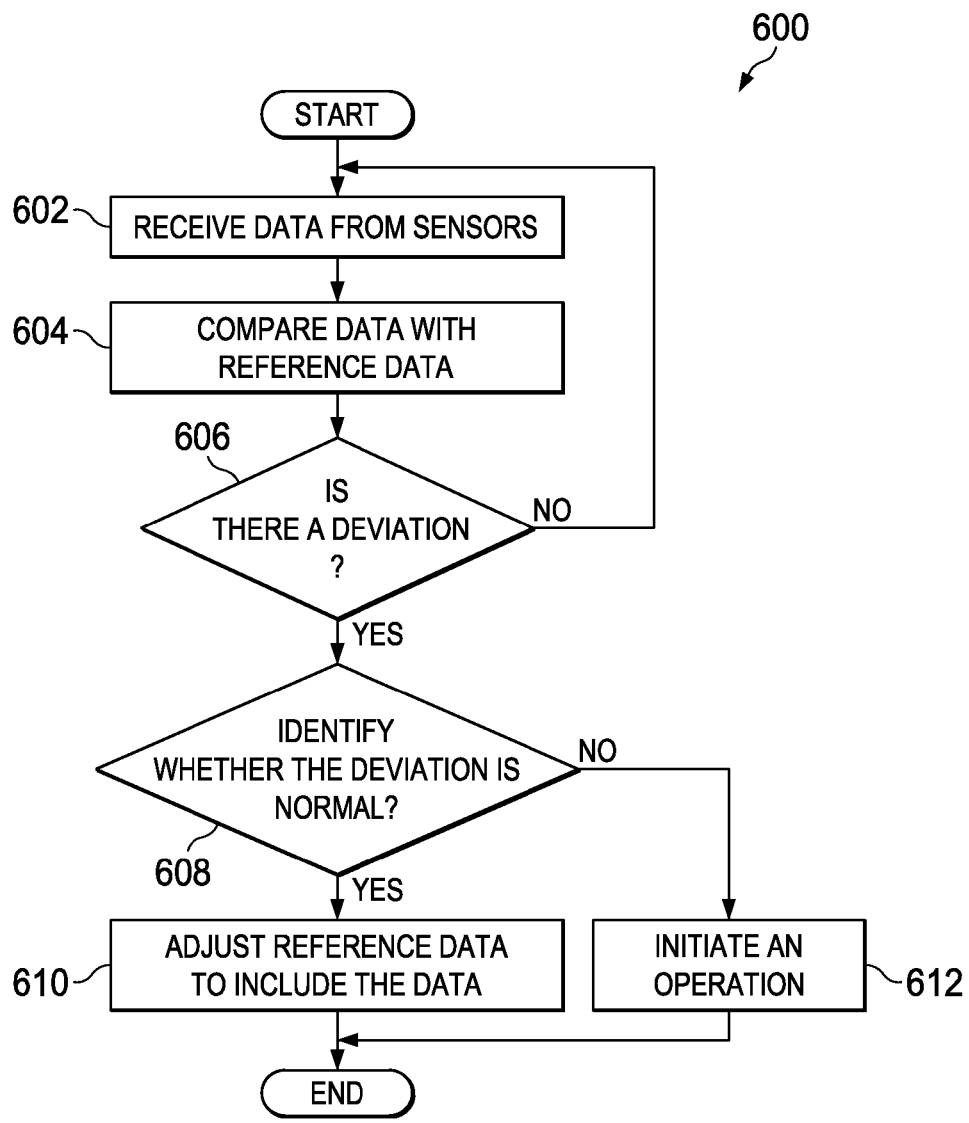
FIG. 6 is simplified flowchart illustrating example operational steps that may be associated with possible activities of the communication system of the present disclosure.

FIG. 6 is a high level flow 600 providing example steps of behavior engine module 25 for managing anomalies. Flow 600 begins at step 602 by receiving data from sensors/machine devices. In one embodiment, data may be received continuously from multiple sensors 14 and/or other machine devices 14 simultaneously. Additionally, the data may be received in real time.

The flow then passes to step 604 to compare the data with reference data. Reference data may be a previous trend of the particular sensor or machine device supplying the data. In different illustrative embodiments, reference data may also be a common trend among the type of sensor or machine device across multiple vehicles.

The flow then continues on to step 606 and a determination is made as to whether a deviation exists in the data from the reference data. If there is no deviation, flow then goes back to step 602 and continues to monitor data received from sensors and other machine devices. If a deviation is detected, the flow moves to step 608 and an identification is made as to whether the deviation is normal. A deviation may be normal if the deviation is minor. A user, driver, and/or algorithm may determine whether a deviation is normal. In different illustrative embodiments, normal deviation may be a behavior defined by a user, driver, and/or algorithm that is acceptable behavior by whatever the sensor is monitoring.

If the deviation is acceptable, the flow continues to step 610 and the reference data is adjusted to include the data. Essentially, the behavior that was identified by the machine device is added to the reference data so that if it is detected again, it will not be considered a deviation. If the deviation is not normal, the flow passes to step 612 and an operation may be initiated. After step 610 or 612, flow 600 terminates or repeats itself.

Figure 7:
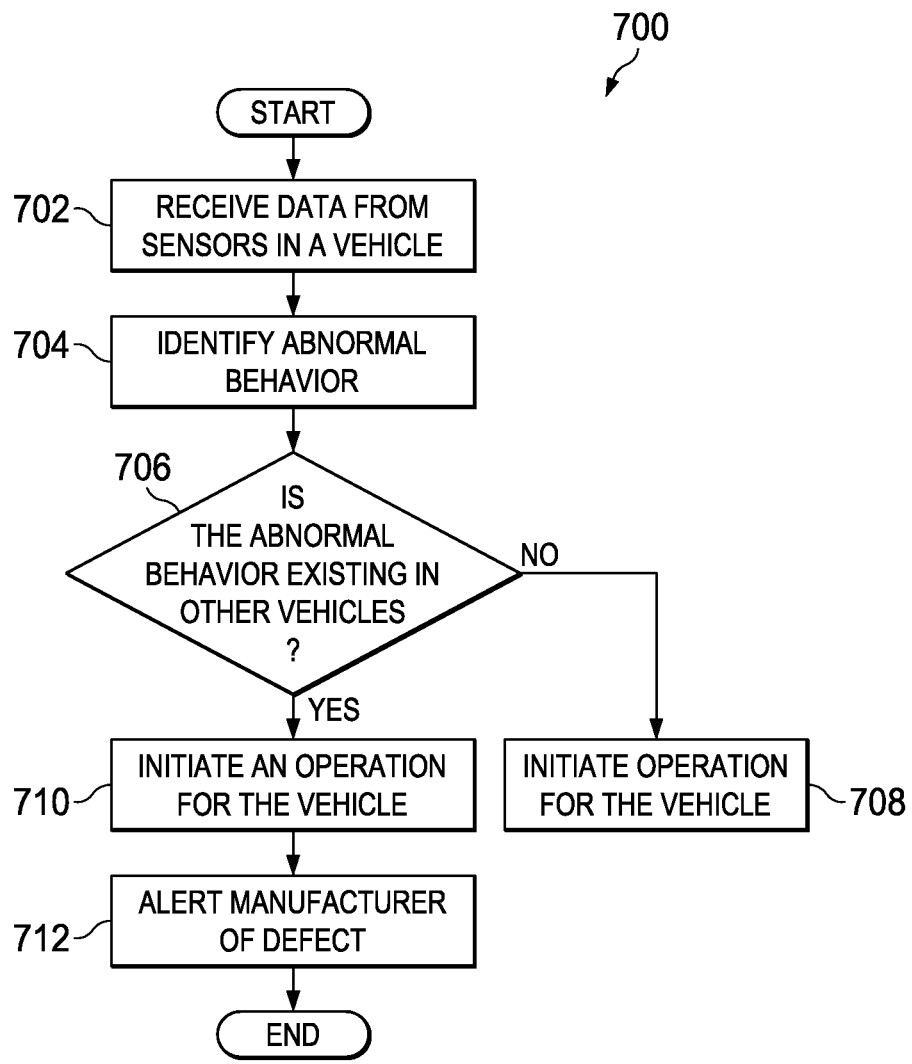
FIG. 7 is simplified flowchart illustrating additional example operational steps that may be associated with possible activities of the communication system of the present disclosure.

FIG. 7 is a high level flow 700 providing other example steps of behavior engine module 25 for managing anomalies across multiple vehicles. Flow 700 begins at step 702 by receiving data from sensors/machine devices. In one embodiment, data may be received continuously from multiple sensors 14 and/or other machine devices 12 simultaneously. Additionally, the data may be received in real time.

The flow then passes to step 704 where abnormal behavior may be identified. Abnormal behavior may be identified through a comparison of trends. Once the abnormal behavior is identified, the flow continues to step 706 where a determination is made as to whether the abnormal behavior also exists in other vehicles. For example, abnormal behavior may be a brake malfunction common across multiple vehicles using a particular type of brake from a particular OEM.

If the abnormal behavior is not in other vehicles, flow passes to step 708 and an operation may be initiated for this particular vehicle. If the abnormal behavior exists in other vehicles, however, then flow passes to step 710 where an operation may be initiated for the vehicle. Additionally, after step 710, flow then continues to step 712 and an alert may be sent to the manufacturer or other organization such as the authorities and/or retailers. The alert may indicate that there is a defect in the machine device. After step 708 or 712, the flow terminates.

Figure 8:
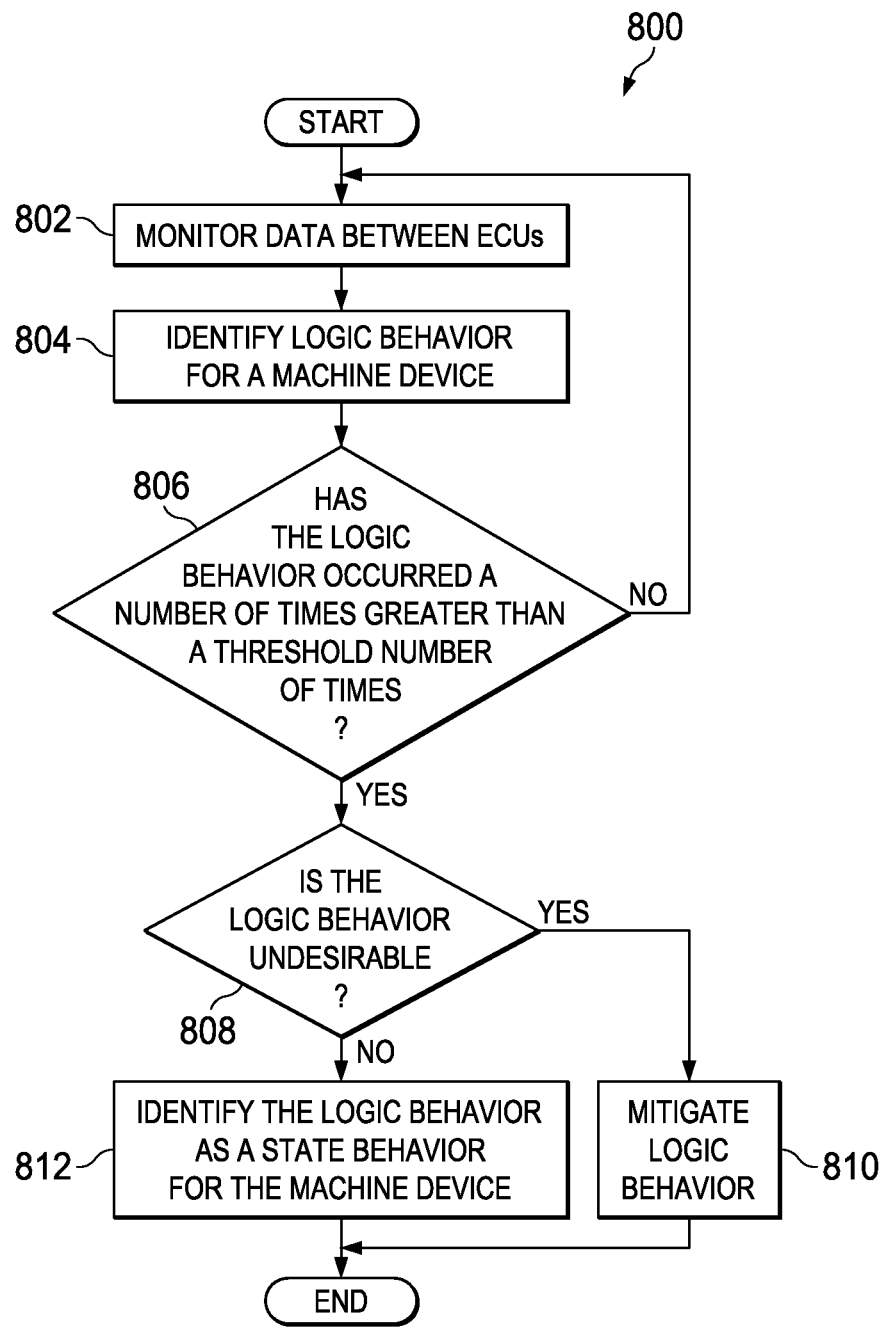
FIG. 8 is simplified flowchart illustrating further example operational steps that may be associated with possible activities of the communication system of the present disclosure.

FIG. 8 is a high level flow 800 providing example steps of learning and monitoring module 31 for managing anomalies across multiple vehicles. Flow 800 begins at step 802 by monitoring data between electronic control units. The data may also be monitored from sensors or machine devices. The flow then continues to step 804 where an identification is made of logic behavior for a machine device. Logic behavior may be a set of the data being transmitted that identifies a particular behavior for a machine device. For example, logic behavior may be the data that represents an acceleration pedal being depressed.

The flow then continues to step 806 and a determination is made as to whether the logic behavior has occurred greater than a threshold number of times. In other words, a determination is made as to whether the logic behavior is common. For example, an identification of an acceleration pedal being depressed is a common behavior.

If the logic behavior has not occurred greater than the threshold number of times, flow passes to step 802 to continue monitoring. If the logic behavior has occurred greater than the threshold number of times, however, flow then passes to step 808 and a determination is made as to whether the logic behavior is undesirable. If the logic behavior is undesirable, flow then moves to step 810 and the logic behavior may be mitigated. Mitigating the logic behavior could occur, for example, by isolating the data, initiating an operation, or shutting down the machine device responsible for the undesirable logic behavior. If the logic behavior is desirable, then the flow passes to step 812 and the logic behavior is identified as a state behavior for that particular machine device. As time passes, the identified state behaviors for a machine device may help generate a complete behavior specification for the machine device. Additionally, with enough information, a behavior state machine can be created. After steps 810 and 812 the flow terminates.

Figure 9:
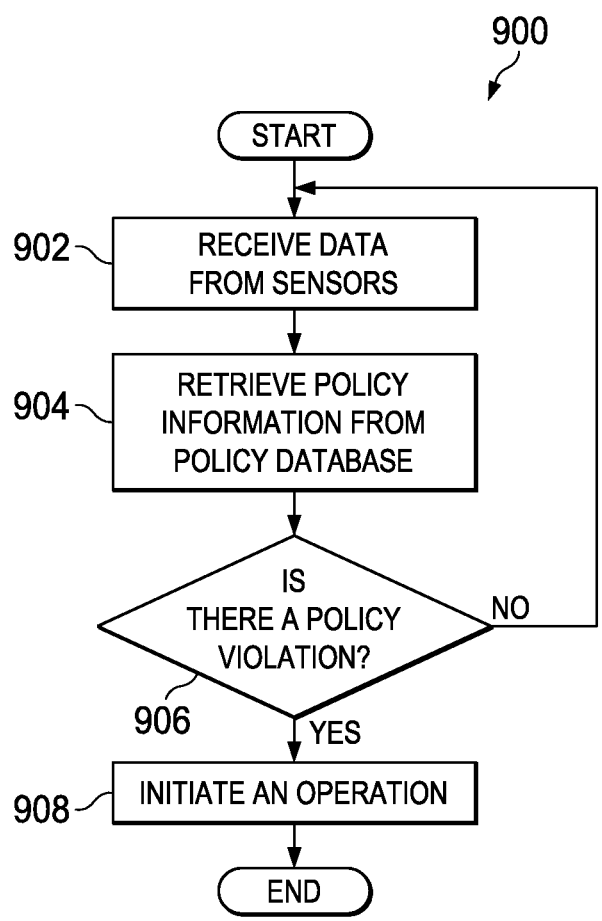
FIG. 9 is a simplified flowchart illustrating yet further example operational steps that may be associated with possible activities of the communication system of the present disclosure.

FIG. 9 is a high level flow 900 providing example steps of behavior engine module 25 for managing anomalies against a policy. Flow 900 begins at step 902 by receiving data from sensors/machine devices. In one embodiment, data may be received continuously from multiple sensors 14 and/or other machine devices 12 simultaneously. Additionally, the data may be received in real time.

The flow then passes to step 904 to retrieve policy information from a policy database. The flow then proceeds to step 906 and a determination is made as to whether there is a violation of a policy from policy database 37.

If there is not a violation, the flow passes back to step 902 and continues to monitor the data received from sensors 14 and/or other machine devices 12. If there is a violation, however, the flow continues to step 908 and may initiate an operation based on the policy violation. Thereafter, the flow terminates.

In certain implementations and numerous examples provided herein, vehicle 4 is described with reference to an automobile. Communication system 10, however, is not limited to automobiles, but can be applied to a myriad of other types of vehicles (e.g., airplanes, boats, trains, etc.). It will be appreciated that the broad teachings disclosed herein are intended to include any type of vehicle used to move from one location to another location, including vehicles that are not designed to transport humans.

In one example implementation, the on-board unit (OBU) (e.g., OBU 30) and cloud components with modules, software, or hardware in clouds (e.g., diagnostic cloud 150, manufacturer cloud 160) are network elements that facilitate or otherwise help coordinate activities related to analyzing vehicular behaviors in a vehicular environment. As used herein, the term 'network element' is meant to encompass computers, network appliances, servers, routers, switches, gateways, bridges, loadbalancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

OBU 30, other associated or integrated components, and any cloud components can include one or more memory elements (e.g., memory element 24, etc.) for storing information to be used in achieving operations associated with analyzing vehicular behavior, including vehicular behavioral analysis, remote diagnostics, predictive diagnostics, and machine device behavior, as outlined herein. Memory element 24 and other associated memory elements may store any appropriate information (e.g., policies, reference data, logs, manufacturer information, routing tables, etc.) to achieve these operations. These devices may further keep information in any suitable memory element (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10, including any associated clouds, could be provided in any database, register, table, cache, queue, control list, or storage structure, based on particular needs and implementations, all of which could be referenced in any suitable timeframe. Any of the memory or storage options discussed herein should be construed as being encompassed within the broad term 'memory element' as used herein in this Specification.

In example embodiments, the operations for enabling analyzing vehicular behavior in a network environment, outlined herein, may be implemented by logic encoded in one or more tangible media, which may be inclusive of non-transitory media (e.g., embedded logic provided in an ASIC, digital signal processor (DSP) instructions, software potentially inclusive of object code and source code to be executed by a processor or other similar machine, etc.). In some of these instances, one or more memory elements (e.g., memory element 24) can store data used for the operations described herein. This includes the memory elements being able to store software, logic, code, or processor instructions that are executed to carry out the activities described in this Specification.

Additionally, OBU 30, associated or integrated components, and cloud components may include processing elements 21 (e.g., computing processor 22, routing processor 23, etc.) that can execute software or algorithms to perform activities to enable analyzing vehicular behavior and to route packets using suitable routing protocols in a vehicular environment. A processor can execute any type of instructions associated with the data to achieve the operations detailed herein in this Specification. In one example, the processors (as shown in various FIGURES) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., an FPGA, an EPROM, an EEPROM), or an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. Any of the potential processing elements, modules, microprocessors, digital signal processors (DSPs), and other devices described in this Specification should be construed as being encompassed within the broad term 'processor.'

In example implementations, at least some portions of the vehicular behavioral analysis activities outlined herein may be implemented in software in, for example, the OBU and/or various cloud components. In some embodiments, one or more of these features may be implemented in hardware, provided external to these elements, or consolidated in any appropriate manner to achieve the intended functionality. The OBU and cloud components may include software (or reciprocating software) that can coordinate in order to achieve the operations, as outlined herein. In still other embodiments, one or both of these elements may include any suitable algorithms, hardware, software, components, modules, interfaces, or objects that facilitate the operations thereof. Furthermore, OBUs and cloud components described and shown herein may also include suitable interfaces for receiving, transmitting, and/or otherwise communicating data or information in a network environment. Additionally, some of the processors and memory elements associated with the various network elements may be removed, or otherwise consolidated such that a single processor and a single memory location are responsible for certain activities. In a general sense, the arrangements depicted in the FIGURES may be more logical in their representations, whereas a physical architecture may include various permutations, combinations, and/or hybrids of these elements.

Note that with the numerous examples provided herein, interaction may be described in terms of two, three, four, or more network elements. However, this has been done for purposes of clarity and example only. It should be appreciated that the system can be consolidated in any suitable manner. Along similar design alternatives, any of the illustrated computers, modules, components, and elements of the FIGURES may be combined in various possible configurations, all of which are clearly within the broad scope of this Specification. In certain cases, it may be easier to describe one or more of the functionalities of a given set of flows by only referencing a limited number of network elements. It should be appreciated that communication system 10 of the FIGURES and its teachings are readily scalable and can accommodate a large number of components, as well as more complicated/sophisticated arrangements and configurations. Accordingly, the examples provided should not limit the scope or inhibit the broad teachings of communication system 10 as potentially applied to a myriad of other architectures.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols in which packets are exchanged in order to provide vehicular behavioral analysis functions. Moreover, although communication system 10 has been illustrated with reference to particular elements and operations that facilitate the communication process, these elements and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

What is claimed is:

1. A method executed by an on-board unit of a vehicle, comprising:
   receiving a set of data in real time from a plurality of machine devices associated with a vehicle, wherein the plurality of machine devices includes at least a first machine device monitoring changes in vehicle control system information of the vehicle, at least a second machine device monitoring changes in physiological signals of a driver of the vehicle, and at least a third machine device monitoring changes in events or objects surrounding the vehicle;
   providing a policy with a set of rules;
   comparing the set of data with the policy;
   providing a set of reference data corresponding to a machine device of the plurality of machine devices, wherein the set of reference data includes a trend of previous data received from the machine device;
   comparing the set of data with the set of reference data, wherein a determination of whether the set of data deviates from the trend of previous data is based, at least in part, on a profile of a current driver of the vehicle; and
   initiating an operation when at least one of a violation of the policy and a deviation within the set of data from the set of reference data is detected.

2. The method of claim 1, wherein the set of reference data further includes a common trend based on data from other machine devices of other vehicles similar to the machine device.

3. The method of claim 1, wherein the policy is based on one or more population averages.

4. The method of claim 1, wherein the deviation is within a range, and wherein the operation comprises:
   adjusting the reference set of data based on the set of data to form a new reference set of data.

5. The method of claim 1, further comprising:
   receiving a plurality of data from the plurality of machine devices, wherein the set of data is in the plurality of data; and
   identifying a state of the machine device using the set of data, wherein the state is based on a behavior associated with the machine device.

6. The method of claim 5, wherein the step of identifying the state from the machine device using the set of data further comprises:
   determining whether the set of data has occurred greater than a threshold number of times; and
   identifying the state from the machine device using the set of data if the set of data has occurred greater than the threshold number of times.

7. The method of claim 5, wherein the step of identifying the state from the machine device using the set of data further comprises:
   determining whether the set of data represents an undesirable behavior in a machine device of the plurality of machine devices;
   mitigating the undesirable behavior if the set of data represents an undesirable behavior in the machine device of the plurality of machine devices; and
   identifying the state from the machine device using the set of data if the set of data does not represent undesirable behavior in the machine device of the plurality of machine devices.

8. The method of claim 5, further comprising:
   transmitting the state of the machine device of the plurality of machine devices to other vehicles.

9. The method of claim 5, further comprising:
   determining whether the state is undesirable; and
   mitigating the state if the state is determined to be undesirable.

10. The method of claim 9, wherein mitigating the state may comprise at least one of sending an alert to an entity, shutting down the machine device responsible for the state, and initiating a corrective action.

11. The method of claim 1, wherein the profile includes physiological information associated with the current driver.

12. Logic encoded in non-transitory media that includes code for execution and when executed by a processor is operable to perform operations comprising:
   receiving a set of data in real time from a plurality of machine devices associated with a vehicle, wherein the plurality of machine devices includes at least a first machine device monitoring changes in vehicle control system information of the vehicle, at least a second machine device monitoring changes in physiological signals of a driver of the vehicle, and at least a third machine device monitoring changes in events or objects surrounding the vehicle;
   providing a policy with a set of rules;
   comparing the set of data with the policy;
   providing a set of reference data corresponding to a machine device of the plurality of machine devices, wherein the set of reference data includes a trend of previous data received from the machine device;
   comparing the set of data with the set of reference data, wherein a determination of whether the set of data deviates from the trend of previous data is based, at least in part, on a profile of a current driver of the vehicle; and
   initiating an operation when at least one of a violation of the policy and a deviation within the set of data from the set of reference data is detected.

13. The logic of claim 12, wherein the trend of previous data is based on the current driver.

14. The logic of claim 12, wherein the determination of whether the set of data deviates from the trend of previous data is based, at least in part, on current driving conditions.

15. The logic of claim 12, wherein the set of rules of the policy includes specific elements of a standard applied to one or more machine devices, wherein a violation of one or more of the rules by a particular machine device does not indicate the particular machine device is malfunctioning.

16. An apparatus, comprising:
   a memory element configured to store data;
   a behavior engine module; and
   a processor operable to execute instructions associated with the data, wherein the processor, the memory element, and the behavior engine module cooperate such that the apparatus is configured for:

receiving a set of data in real time from a plurality of machine devices associated with a vehicle, wherein the plurality of machine devices includes at least a first machine device monitoring changes in vehicle control system information of the vehicle, at least a second machine device monitoring changes in physiological signals of a driver of the vehicle, and at least a third machine device monitoring changes in events or objects surrounding the vehicle;

providing a policy with a set of rules;

comparing the set of data with the policy;

providing a set of reference data corresponding to a machine device of the plurality of machine devices, wherein the set of reference data includes a trend of previous data received from the machine device;

comparing the set of data with the set of reference data, wherein a determination of whether the set of data deviates from the trend of previous data is based, at least in part, on a profile of a current driver of the vehicle; and initiating an operation when at least one of a violation of the policy and a deviation within the set of data from the set of reference data is detected.

17. The apparatus of claim 16, wherein the apparatus is an on-board unit of a vehicle.

18. A method executed by processor, comprising:

receiving a plurality of behavior states associated with a plurality of machine devices in a plurality of vehicles, wherein the plurality of machine devices includes first machine devices monitoring changes in vehicle control system information of the plurality of vehicles, second machine devices monitoring changes in physiological signals of drivers of the plurality of vehicles, and third machine devices monitoring changes in events or objects surrounding the plurality of vehicles;

monitoring the plurality of behavior states;

identifying abnormal behavior of machine device based on a corresponding behavior state in the plurality of behavior states;

determining the abnormal behavior indicates a manufacturing defect of the machine device when the abnormal behavior exists in greater than a threshold number of vehicles of the plurality of vehicles having a same type and model; and initiating an operation when the abnormal behavior exists in greater than the threshold number of vehicles having a same type and model, wherein at least some behavior states are built by observing interactions between at least two machine devices of a vehicle at runtime, wherein the at least two machine devices are connected across bus subsystems of the vehicle.

19. The method of claim 18, wherein the operation is at least one of alerting a manufacturer of a defect in the machine device associated with the abnormal behavior, alerting all drivers of vehicles with the machine devices associated with the abnormal behavior of the abnormal behavior, and alerting safety authorities of the abnormal behavior.

20. The method of claim 19, further comprising:

alerting a driver of the vehicle with the machine device associated with the abnormal behavior of the abnormal behavior if the abnormal behavior exists in less than the threshold number of vehicles of the plurality of vehicles.

21. The method of claim 18, wherein at least one other behaviour state is built by correlating interactions between a plurality of machine devices of a particular vehicle at runtime.

22. The method of claim 18, further comprising:

receiving a behavior state from a vehicle of the plurality of vehicles; and sending the behavior state to other vehicles in the plurality of vehicles with similar machine devices.

* * * * *